United States Patent
Bellegarda

(10) Patent No.: US 12,380,281 B2
(45) Date of Patent: *Aug. 5, 2025

(54) INJECTION OF USER FEEDBACK INTO LANGUAGE MODEL ADAPTATION

(71) Applicant: Apple Inc., Cupertino, CA (US)

(72) Inventor: Jerome R. Bellegarda, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 17/902,505

(22) Filed: Sep. 2, 2022

(65) Prior Publication Data
US 2023/0394248 A1    Dec. 7, 2023

Related U.S. Application Data

(60) Provisional application No. 63/348,362, filed on Jun. 2, 2022.

(51) Int. Cl.
*G06F 40/40* (2020.01)
*G06F 3/0482* (2013.01)
*G06N 5/022* (2023.01)

(52) U.S. Cl.
CPC ............ *G06F 40/40* (2020.01); *G06N 5/022* (2013.01); *G06F 3/0482* (2013.01)

(58) Field of Classification Search
CPC .... G06F 40/40; G06F 3/0482; G06F 3/04883; G06F 40/30; G06N 5/022; G06N 3/044; G06N 3/045; G06N 3/084
See application file for complete search history.

(56) References Cited

U.S. PATENT DOCUMENTS

| | | |
|---|---|---|
| 7,475,015 B2 | 1/2009 | Epstein et al. |
| 7,707,221 B1 | 4/2010 | Dunning et al. |
| 7,752,152 B2 | 7/2010 | Paek et al. |
| 7,756,708 B2 | 7/2010 | Cohen et al. |
| 7,774,202 B2 | 8/2010 | Spengler et al. |

(Continued)

FOREIGN PATENT DOCUMENTS

| | | |
|---|---|---|
| CN | 102122506 A | 7/2011 |
| CN | 104036774 A | 9/2014 |

(Continued)

OTHER PUBLICATIONS

Bodapati et al., "Neural Word Decomposition Models for Abusive Language Detection", Proceedings of the Third Workshop on Abusive Language Online, Aug. 1, 2019, pp. 135-145.

(Continued)

*Primary Examiner* — Darioush Agahi
(74) *Attorney, Agent, or Firm* — DLA Piper LLP (US)

(57) ABSTRACT

The present disclosure generally relates to updating a language model based on user feedback. Based on a user text input, a language model predicts a set of tokens and an action that will be taken by the user in response to the predicted set of tokens. If the predicted action does not match a detected actual user action, the language model is updated to reflect the user feedback by modifying an output token probability distribution based on the actual user action and updating the language model to converge with a target language model using the modified output token probability distribution.

34 Claims, 13 Drawing Sheets

(56) References Cited

U.S. PATENT DOCUMENTS

| | | |
|---|---|---|
| 7,797,338 B2 | 9/2010 | Feng et al. |
| 8,244,545 B2 | 8/2012 | Paek et al. |
| 8,270,933 B2 | 9/2012 | Riemer et al. |
| 8,515,736 B1 | 8/2013 | Duta |
| 8,626,681 B1 | 1/2014 | Jurca et al. |
| 8,812,321 B2 | 8/2014 | Gilbert et al. |
| 9,292,487 B1 | 3/2016 | Weber |
| 9,292,489 B1 | 3/2016 | Sak et al. |
| 9,330,659 B2 | 5/2016 | Ju et al. |
| 9,367,541 B1 | 6/2016 | Servan et al. |
| 9,437,189 B2 | 9/2016 | Epstein et al. |
| 9,465,833 B2 | 10/2016 | Aravamudan et al. |
| 9,465,864 B2 | 10/2016 | Hu et al. |
| 9,818,400 B2 | 11/2017 | Paulik et al. |
| 9,934,777 B1 | 4/2018 | Joseph et al. |
| 9,986,419 B2 | 5/2018 | Naik et al. |
| 10,049,663 B2 | 8/2018 | Orr et al. |
| 10,049,668 B2 | 8/2018 | Huang et al. |
| 10,083,690 B2 | 9/2018 | Giuli et al. |
| 10,089,072 B2 | 10/2018 | Piersol et al. |
| 10,115,055 B2 | 10/2018 | Weiss et al. |
| 10,127,901 B2 | 11/2018 | Zhao et al. |
| 10,169,329 B2 | 1/2019 | Futrell et al. |
| 10,192,552 B2 | 1/2019 | Raitio et al. |
| 10,223,066 B2 | 3/2019 | Martel et al. |
| 10,249,300 B2 | 4/2019 | Booker et al. |
| 10,269,345 B2 | 4/2019 | Castillo Sanchez et al. |
| 10,296,160 B2 | 5/2019 | Shah et al. |
| 10,297,253 B2 | 5/2019 | Walker, II et al. |
| 10,311,871 B2 | 6/2019 | Newendorp et al. |
| 10,431,210 B1 | 10/2019 | Huang et al. |
| 10,482,875 B2 | 11/2019 | Henry |
| 10,497,365 B2 | 12/2019 | Gruber et al. |
| 10,671,428 B2 | 6/2020 | Zeitlin |
| 10,706,841 B2 | 7/2020 | Gruber et al. |
| 10,791,176 B2 | 9/2020 | Phipps et al. |
| 10,885,277 B2 | 1/2021 | Ravi et al. |
| 10,978,056 B1 | 4/2021 | Challa et al. |
| 10,978,090 B2 | 4/2021 | Binder et al. |
| 10,983,971 B2 | 4/2021 | Carvalho et al. |
| 11,094,311 B2 | 8/2021 | Candelore et al. |
| 11,181,988 B1 | 11/2021 | Bellegarda et al. |
| 2009/0030685 A1 | 1/2009 | Cerra et al. |
| 2009/0055168 A1 | 2/2009 | Wu et al. |
| 2009/0055381 A1 | 2/2009 | Wu et al. |
| 2009/0060351 A1 | 3/2009 | Li et al. |
| 2009/0281789 A1 | 11/2009 | Waibel et al. |
| 2010/0023331 A1 | 1/2010 | Duta et al. |
| 2010/0145694 A1 | 6/2010 | Ju et al. |
| 2010/0318576 A1 | 12/2010 | Kim |
| 2011/0060584 A1 | 3/2011 | Ferrucci et al. |
| 2012/0084086 A1 | 4/2012 | Gilbert et al. |
| 2012/0158399 A1 | 6/2012 | Tremblay et al. |
| 2013/0185336 A1 | 7/2013 | Singh et al. |
| 2013/0238540 A1 | 9/2013 | O'donoghue et al. |
| 2013/0253906 A1* | 9/2013 | Archer ................ G06F 40/274 704/9 |
| 2013/0325436 A1 | 12/2013 | Wang et al. |
| 2014/0244248 A1 | 8/2014 | Arisoy et al. |
| 2014/0244254 A1 | 8/2014 | Ju et al. |
| 2014/0278379 A1 | 9/2014 | Coccaro et al. |
| 2015/0006148 A1 | 1/2015 | Goldszmit et al. |
| 2015/0039292 A1 | 2/2015 | Suleman et al. |
| 2015/0073788 A1 | 3/2015 | Sak et al. |
| 2015/0161521 A1 | 6/2015 | Shah et al. |
| 2015/0186155 A1 | 7/2015 | Brown et al. |
| 2015/0279360 A1 | 10/2015 | Mengibar et al. |
| 2015/0294670 A1 | 10/2015 | Roblek et al. |
| 2015/0314454 A1 | 11/2015 | Breazeal et al. |
| 2015/0340034 A1 | 11/2015 | Schalkwyk et al. |
| 2016/0078860 A1 | 3/2016 | Paulik et al. |
| 2016/0086599 A1 | 3/2016 | Kurata et al. |
| 2016/0092766 A1 | 3/2016 | Sainath et al. |
| 2016/0155442 A1 | 6/2016 | Kannan et al. |
| 2016/0162456 A1 | 6/2016 | Munro et al. |
| 2016/0210551 A1 | 7/2016 | Lee et al. |
| 2016/0267904 A1 | 9/2016 | Biadsy et al. |
| 2017/0053652 A1 | 2/2017 | Choi et al. |
| 2017/0154033 A1 | 6/2017 | Lee |
| 2017/0270912 A1 | 9/2017 | Levit et al. |
| 2018/0137857 A1 | 5/2018 | Zhou et al. |
| 2018/0150744 A1 | 5/2018 | Orr et al. |
| 2018/0158552 A1 | 6/2018 | Liu et al. |
| 2018/0182376 A1 | 6/2018 | Gysel et al. |
| 2018/0329998 A1 | 11/2018 | Thomson et al. |
| 2019/0034040 A1 | 1/2019 | Shah et al. |
| 2019/0035385 A1 | 1/2019 | Lawson et al. |
| 2019/0114320 A1 | 4/2019 | Patwardhan et al. |
| 2019/0163667 A1 | 5/2019 | Feuz et al. |
| 2020/0076538 A1 | 3/2020 | Soultan et al. |
| 2020/0098352 A1 | 3/2020 | Feinstein et al. |
| 2020/0104357 A1 | 4/2020 | Bellegarda et al. |
| 2020/0279627 A1 | 9/2020 | Nida et al. |
| 2021/0224474 A1 | 7/2021 | Jerome et al. |
| 2022/0067283 A1 | 3/2022 | Bellegarda et al. |
| 2022/0084511 A1 | 3/2022 | Nickson et al. |
| 2022/0093088 A1 | 3/2022 | Sridhar et al. |
| 2022/0229985 A1 | 7/2022 | Bellegarda et al. |
| 2023/0351149 A1* | 11/2023 | Yu .......................... G06N 3/045 |
| 2024/0104353 A1* | 3/2024 | Leblond .................. G06N 5/01 |

FOREIGN PATENT DOCUMENTS

| | | |
|---|---|---|
| CN | 107123417 B | 6/2020 |
| EP | 2339576 A2 | 6/2011 |
| WO | 2014/096506 A1 | 6/2014 |

OTHER PUBLICATIONS

Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.

Czech Lucas, "A System for Recognizing Natural Spelling of English Words", Diploma Thesis, Karlsruhe Institute of Technology, May 7, 2014, 107 pages.

Ganin et al., "Unsupervised Domain Adaptation by Backpropagation", in Proceedings of the 32nd International Conference on Machine Learning, vol. 37, Jul. 2015, 10 pages.

Goodfellow et al., "Generative Adversarial Networks", Proceedings of the Neural Information Processing Systems, Dec. 2014, 9 pages.

Gupta et al., "I-vector-based Speaker Adaptation of Deep Neural Networks for French Broadcast Audio Transcription", ICASSP, 2014, 2014, pp. 6334-6338.

Jiang et al., "A Syllable-based Name Transliteration System", Proceedings of the 2009 Named Entities Workshop, Aug. 7, 2009, pp. 96-99.

Jouvet et al., "Evaluating Grapheme-to-phoneme Converters in Automatic Speech Recognition Context", IEEE, 2012, pp. 4821-4824.

Kannan et al., "Smart Reply: Automated Response Suggestion for Email", Available Online at: https://arxiv.org/pdf/1606.04870.pdf, Jun. 15, 2016, 10 pages.

Malcangi Mario, "Text-driven avatars based on artificial neural networks and fuzzy logic", International Journal of Computers, vol. 4, No. 2, Dec. 31, 2010, pp. 61-69.

Mikolov et al., "Linguistic Regularities in Continuous Space Word Representations", Proceedings of NAACL-HLT, Jun. 9-14, 2013, pp. 746-751.

Mnih et al., "Human-Level Control Through Deep Reinforcement Learning", Nature, vol. 518, Feb. 26, 2015, pp. 529-533.

Phoenix Solutions, Inc., "Declaration of Christopher Schmandt Regarding the MIT Galaxy System", West Interactive Corp., a Delaware Corporation, Document 40, Jul. 2, 2010, 162 pages.

Samsung, "SGH-a885 Series—Portable Quad-Band Mobile Phone-User Manual", Retrieved from the Internet:URL: http://web.archive.org/web/20100106113758/http://www.comparecellular.com/images/phones/userguide1896.pdf, Jan. 1, 2009, 144 pages.

(56) References Cited

OTHER PUBLICATIONS

Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", InterSpeech 2012, Sep. 9-13, 2012, pp. 194-197.
Tamar et al., "Value Iteration Networks", Advances in Neural Information Processing Systems, vol. 29, 2016, 16 pages.
Tur et al., "The CALO Meeting Assistant System", IEEE Transactions on Audio, Speech, and Language Processing, vol. 18, No. 6, Aug. 2010, pp. 1601-1611.
Wikipedia, "Acoustic Model", available at <http://en.wikipedia.org/wiki/AcousticModel>, retrieved on Sep. 14, 2011, pp. 1-2.
Wikipedia, "Language Model", available at <http://en.wikipedia.org/wiki/Language_model>, retrieved on Sep. 14, 2011, 4 pages.
Win, et al., "Myanmar Text to Speech System based on Tacotron-2", International Conference on Information and Communication Tehcnology Convergence (ICTC), Oct. 21-23, 2020, pp. 578-583.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.

* cited by examiner

INJECTION OF USER FEEDBACK INTO LANGUAGE MODEL ADAPTATION

CROSS-REFERENCE TO RELATED APPLICATIONS

This application claims priority to U.S. Provisional Application No. 63/348,362, entitled "INJECTION OF USER FEEDBACK INTO LANGUAGE MODEL ADAPTATION," and filed Jun. 2, 2022, the content of which is hereby incorporated by reference.

FIELD

The present disclosure relates generally to updating a language model based on user data.

BACKGROUND

Language models can be used to generate text predictions based on text input by a user, such as corrections to the input text and/or predictions of the next text following the text input. The language models can be trained on training data including a very large amount of text samples, including user-specific text samples. Users may provide feedback in response to the predicted text, including accepting the prediction or rejecting the prediction, for instance, by explicitly dismissing the prediction, accepting an unexpected prediction, or manually inputting unexpected text.

BRIEF SUMMARY

Some techniques for training and updating language models using electronic devices, however, are generally cumbersome and inefficient. For example, although both user feedback and user-specific text samples provide useful data reflecting a user's preferences, compared to the size of a general training corpus, an average user produces very little text and even fewer responses to predictions. This relative scarcity of user data makes updating the language model in a way that reflects the user data difficult. Additionally, user feedback can indicate both a user action and a user-input token sequence. However, due to the difference in the size and nature between action predictions and token predictions, integrating both types of user feedback information can increase latency.

Accordingly, the present technique provides electronic devices with faster, more efficient methods and interfaces for updating a language model based on user data. Such methods and interfaces optionally complement or replace other methods for updating a language model based on user feedback. Adjusting a language model based on user feedback prior to adapting (e.g., comparing) the language model to a target using an adversarial framework efficiently integrates the user feedback into an update process. Such methods and interfaces additionally reduce the cognitive burden on a user and produce a more efficient human-machine interface by providing more accurate and useful text prediction for the specific user. For battery-operated computing devices, such methods and interfaces conserve power and increase the time between battery charges.

Example processes are disclosed herein. An example process for updating a language model includes, at an electronic device with one or more processors and a memory, receiving one or more input tokens; in response to receiving the one or more input tokens, predicting, using a first output token probability distribution drawn from a first overall probability distribution of a first language model, a first set of one or more output tokens; generating a predicted user action to be performed on the first set of one or more output tokens; providing an output including the first set of one or more output tokens; detecting a first user action responding to the first set of one or more output tokens; and, in accordance with a determination that the first user action does not match the predicted user action: generating a modified output token probability distribution based on the first user action; and, based on the modified output token probability distribution, updating the first overall token probability distribution to converge to a second overall token probability distribution.

Example electronic devices are disclosed herein. An example electronic device includes one or more processors; a memory; and one or more programs, wherein the one or more programs are stored in the memory and configured to be executed by the one or more processors, the one or more programs including instructions for receiving one or more input tokens; in response to receiving the one or more input tokens, predicting, using a first output token probability distribution drawn from a first overall probability distribution of a first language model, a first set of one or more output tokens; generating a predicted user action to be performed on the first set of one or more output tokens; providing an output including the first set of one or more output tokens; detecting a first user action responding to the first set of one or more output tokens; and, in accordance with a determination that the first user action does not match the predicted user action: generating a modified output token probability distribution based on the first user action; and, based on the modified output token probability distribution, updating the first overall token probability distribution to converge to a second overall token probability distribution.

Example non-transitory computer-readable storage media are disclosed herein. An example non-transitory computer-readable storage medium storing one or more programs, the one or more programs comprising instructions, which when executed by one or more processors of a first electronic device, cause the first electronic device to receive one or more input tokens; in response to receiving the one or more input tokens, predict, using a first output token probability distribution drawn from a first overall probability distribution of a first language model, a first set of one or more output tokens; generate a predicted user action to be performed on the first set of one or more output tokens; provide an output including the first set of one or more output tokens; detect a first user action responding to the first set of one or more output tokens; and, in accordance with a determination that the first user action does not match the predicted user action: generate a modified output token probability distribution based on the first user action; and, based on the modified output token probability distribution, update the first overall token probability distribution to converge to a second overall token probability distribution.

Example transitory computer-readable storage media are disclosed herein. An example transitory computer readable storage medium storing one or more programs, the one or more programs comprising instructions, which when executed by one or more processors of a first electronic device, cause the first electronic device to receive one or more input tokens; in response to receiving the one or more input tokens, predict, using a first output token probability distribution drawn from a first overall probability distribution of a first language model, a first set of one or more output tokens; generate a predicted user action to be performed on the first set of one or more output tokens; provide an output including the first set of one or more output tokens; detect a first user action responding to the first set of one or more output tokens; and, in accordance with a determination that the first user action does not match the predicted user action: generate a modified output token probability distribution based on the first user action; and, based on the modified output token probability distribution, update the first overall token probability distribution to converge to a second overall token probability distribution.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for updating a language model based on user data, thereby increasing the effectiveness, efficiency, and user satisfaction with such devices. Such methods and interfaces may complement or replace other methods for updating a language model based on user data.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for updating a language model based on user feedback. For example, adjusting a language model based on user feedback prior to adapting (e.g., comparing) the language model to a target using an adversarial framework efficiently integrates the user feedback into an update process. Such techniques can reduce the cognitive burden on a user by improving the accuracy and usefulness of text prediction, thereby enhancing productivity. Further, such techniques can reduce processor and battery power otherwise wasted on inefficient language model updates and/or redundant or unnecessary user inputs.

Figure 6:
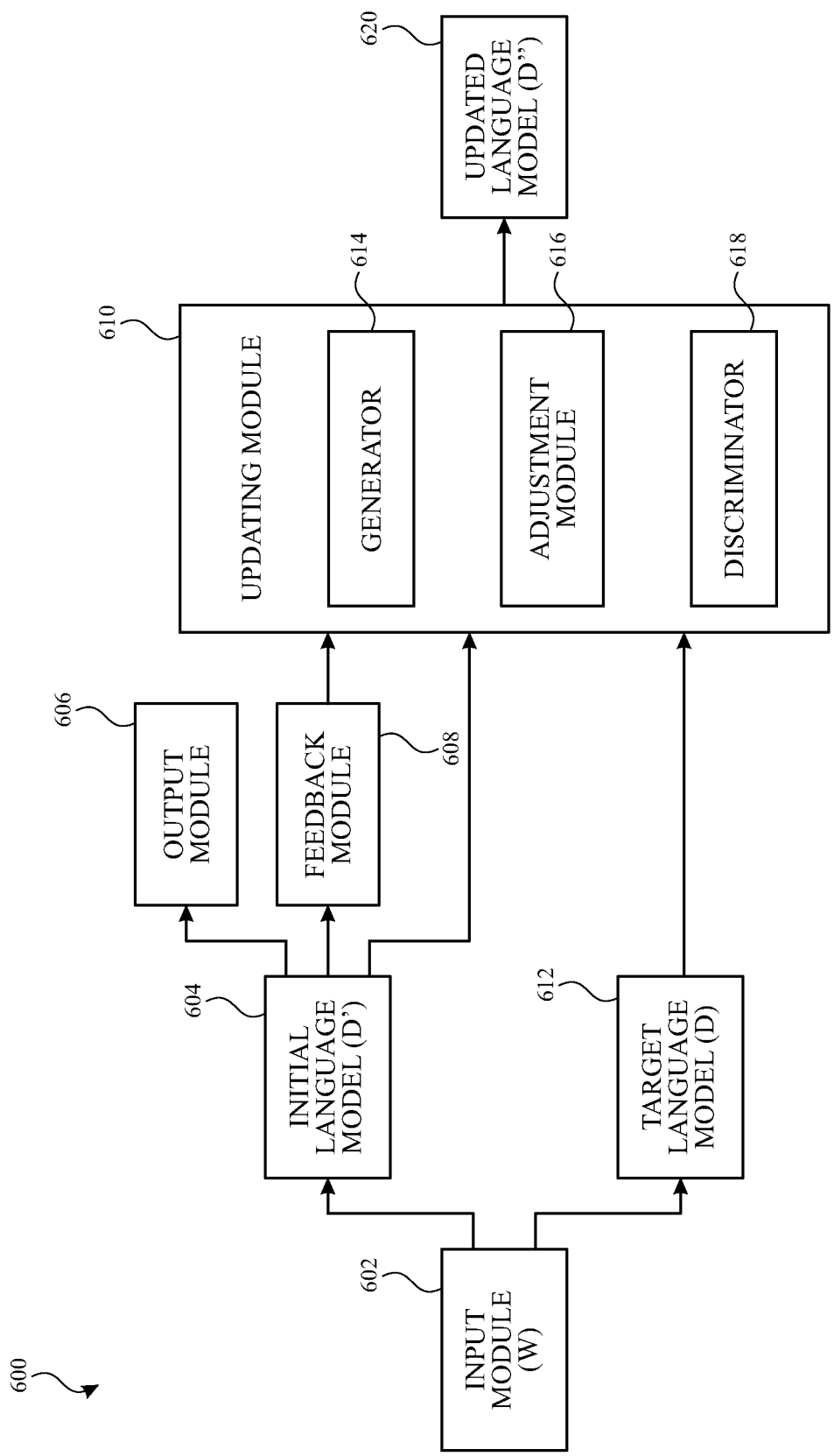
FIG. 6 illustrates a system for updating a language model based on user feedback in accordance with some embodiments.
Figure 7B:
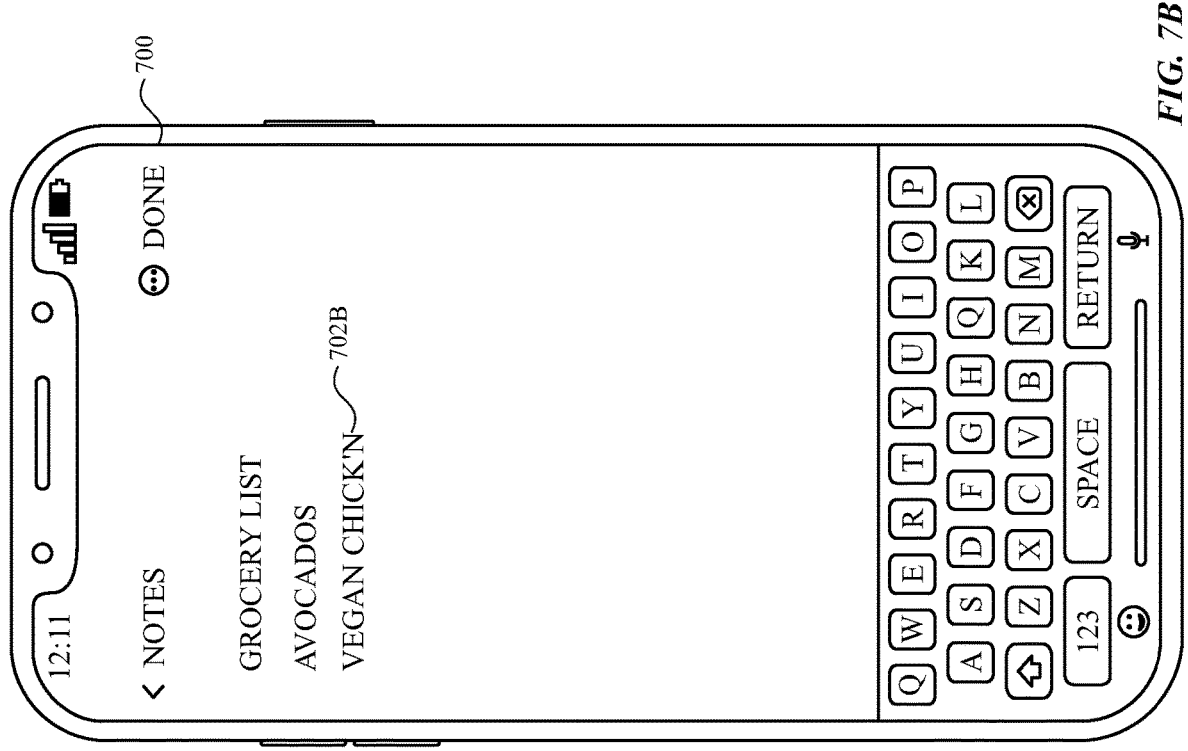
FIGS. 7A-7D illustrate text prediction at an electronic device in accordance with some embodiments.
Figure 7A:
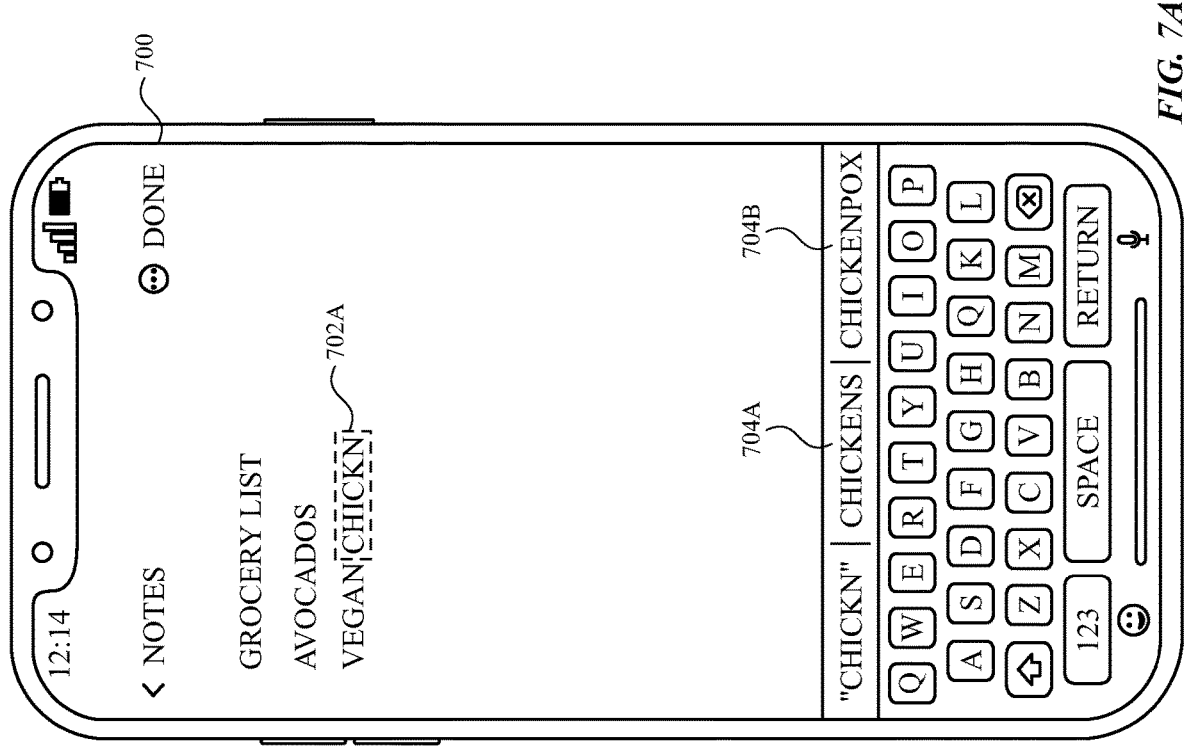
Figure 7D:
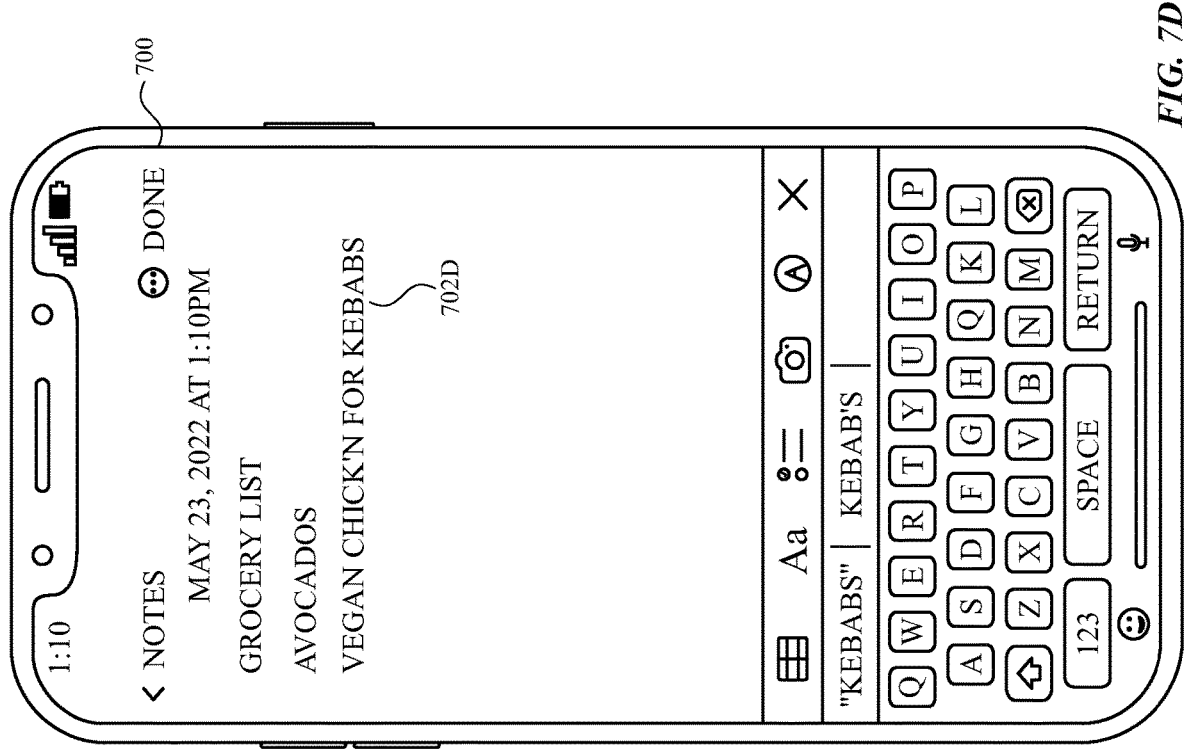
Figure 7C:
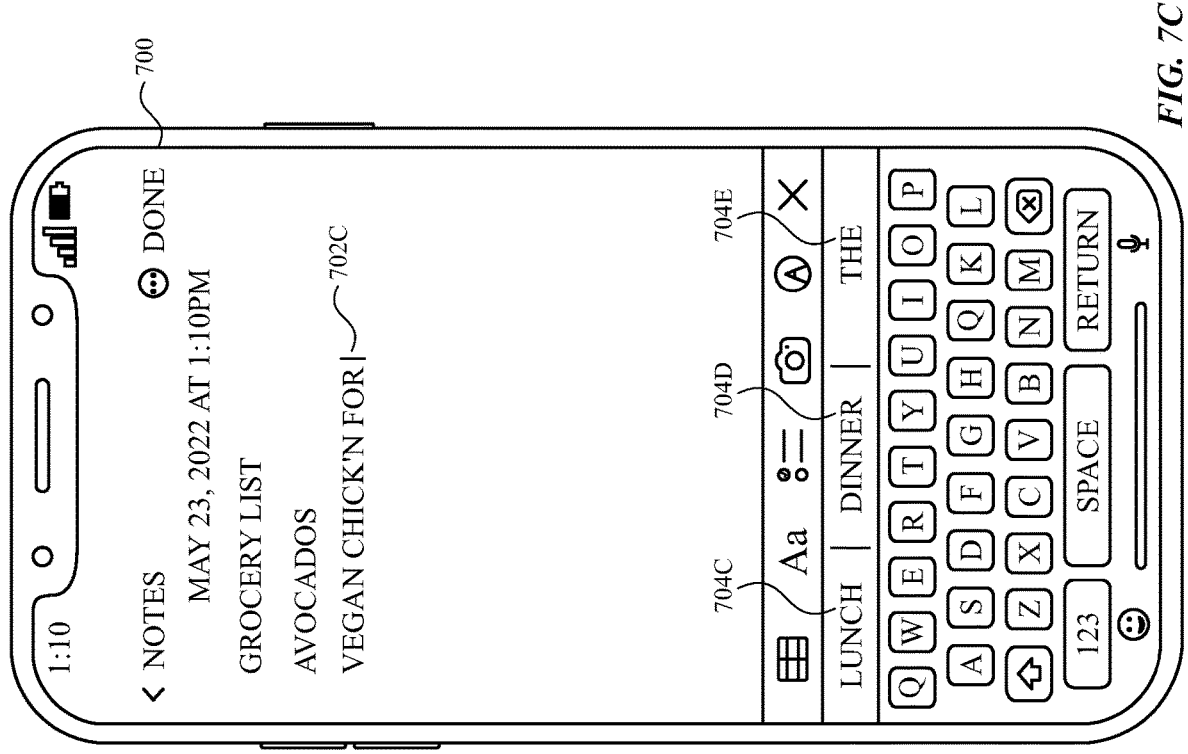
Figure 8A:
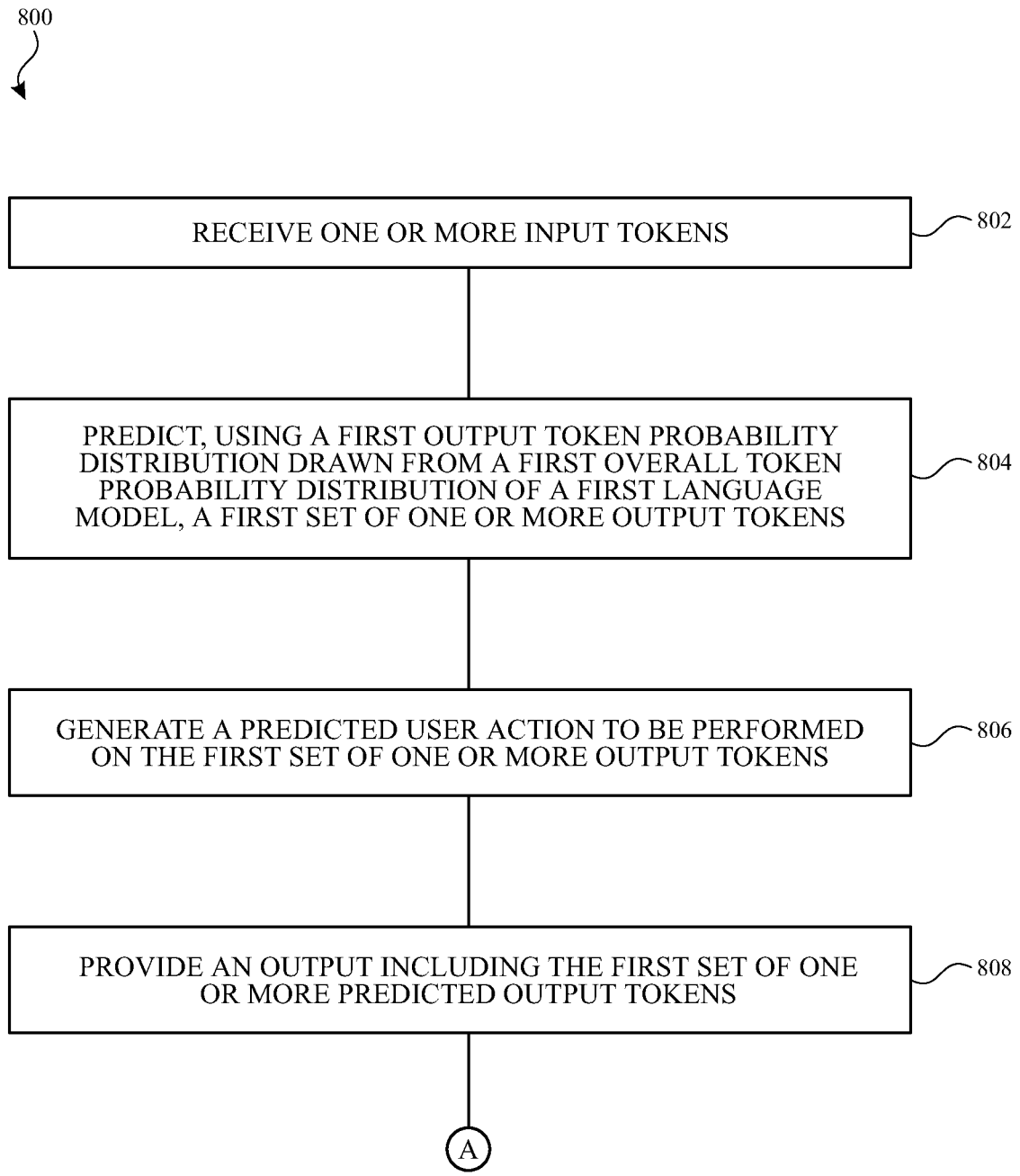
FIGS. 8A-8B illustrate a flow diagram for a process of updating a language model based on user feedback in accordance with some embodiments.
Figure 8B:
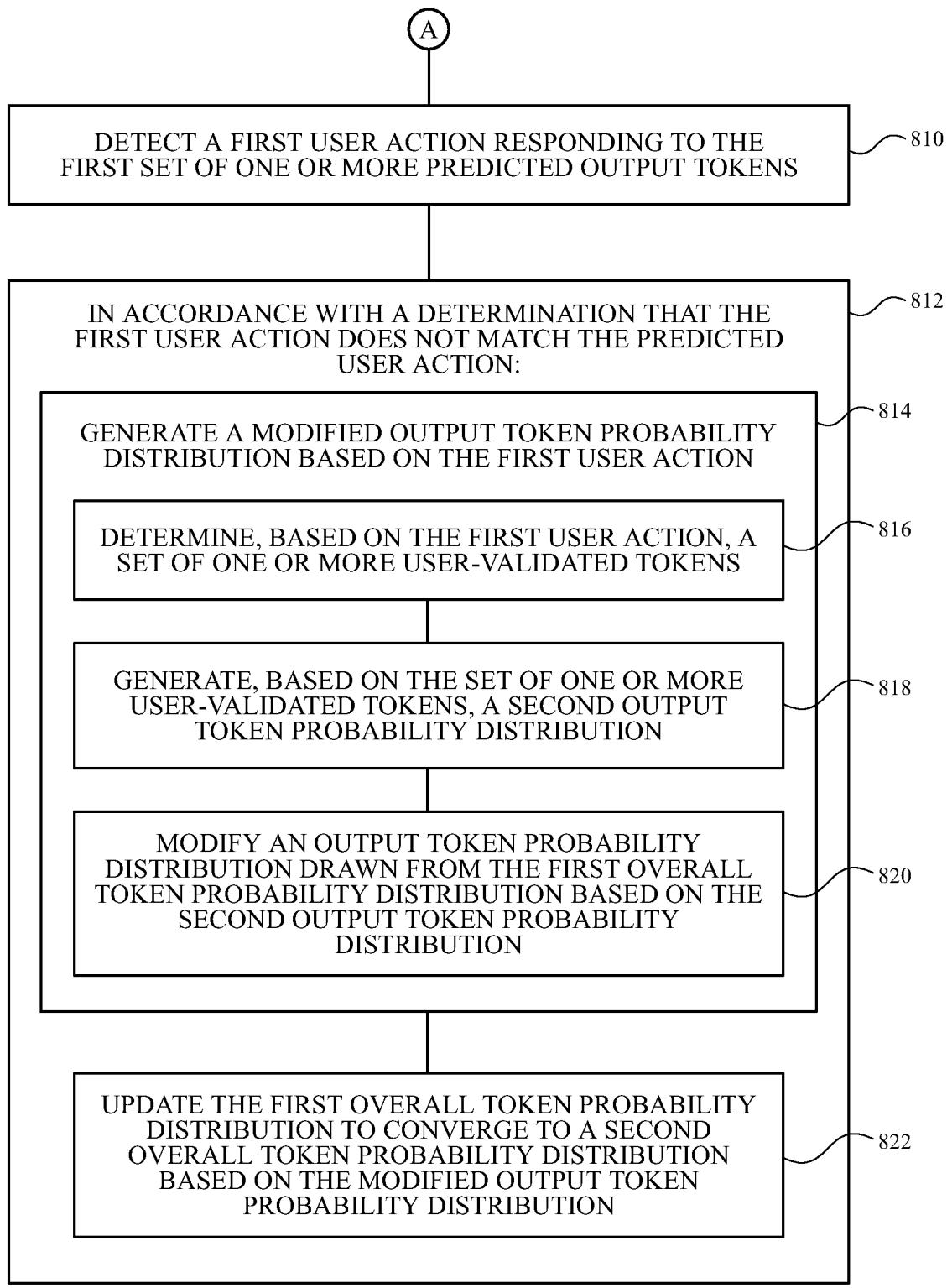

Below, FIGS. 1A-1B, 2, 3, 4A-4B, and 5A-5B provide a description of exemplary devices for performing the techniques for managing event notifications. FIG. 6 illustrates an exemplary system for updating a language model based on user data. FIGS. 7A-7D illustrate text prediction at an electronic device, according to some embodiments. FIGS. 8A-8B illustrate an exemplary flow diagram for updating a language model based on user data. The systems and user interfaces in FIGS. 6-7D are used to illustrate the processes described below, including the processes in FIGS. 8A-8B.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, incorporating user feedback in an accurate and timely manner, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
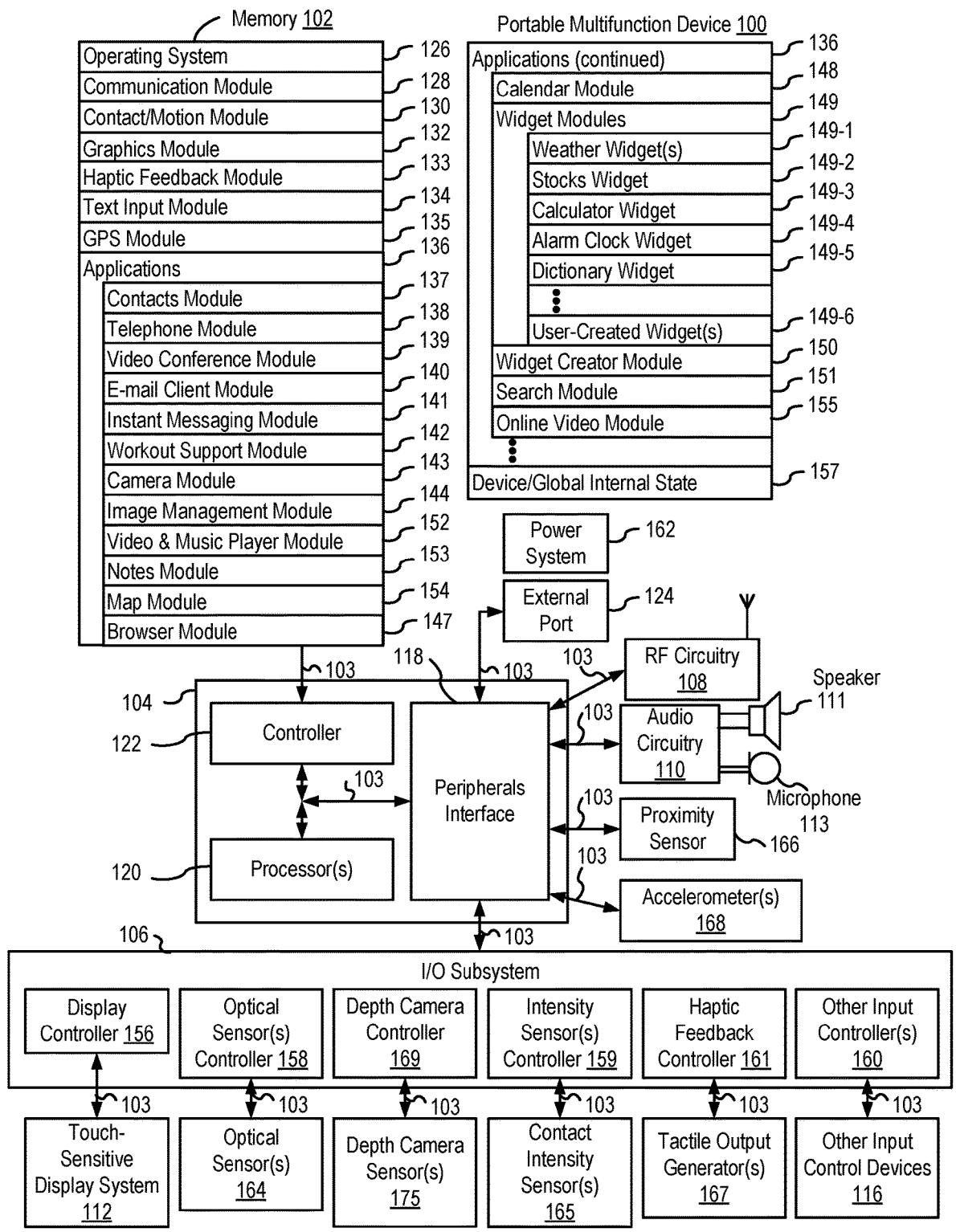
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
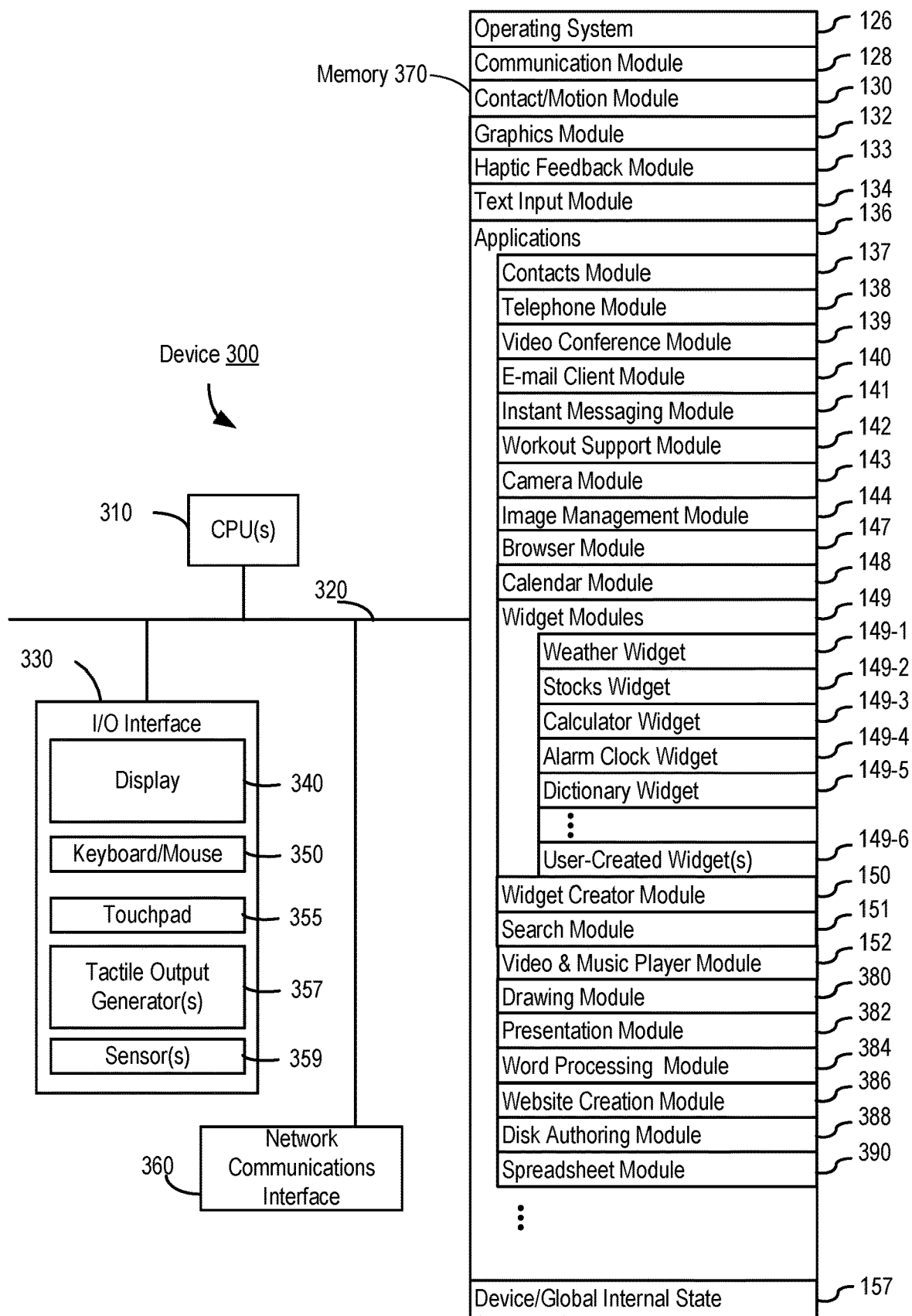
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153; Map module 154; and/or Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals);

communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
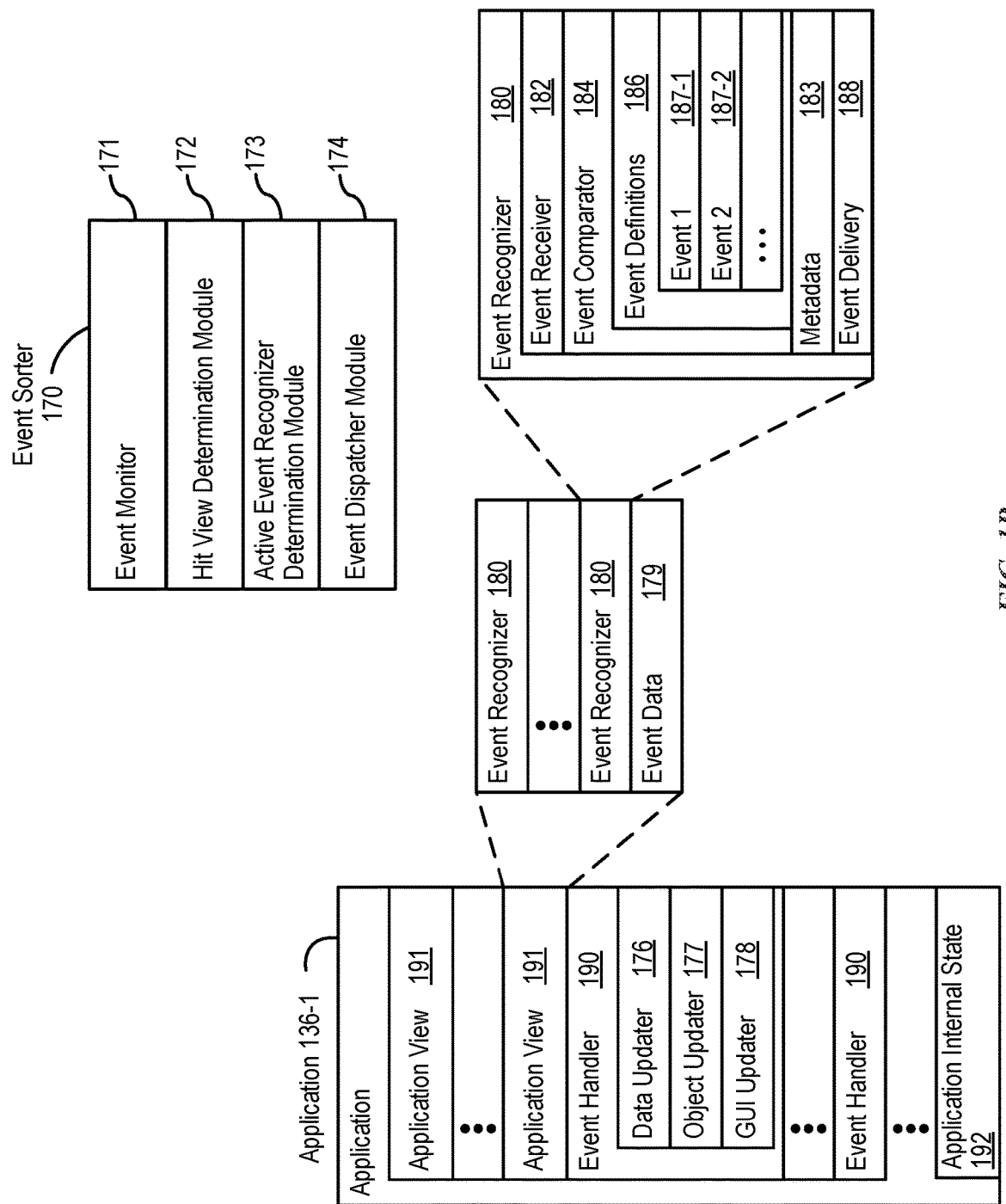
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
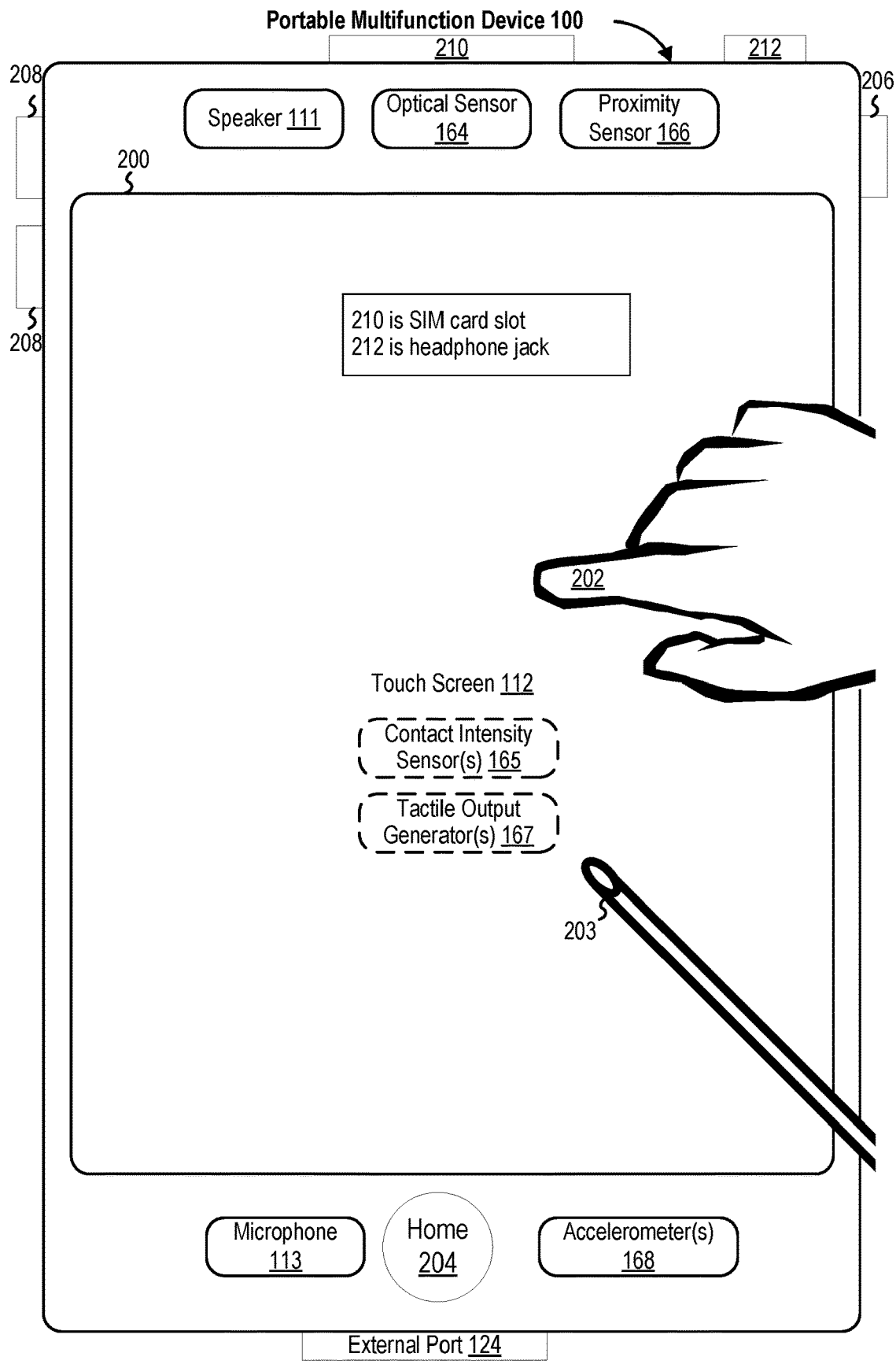
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
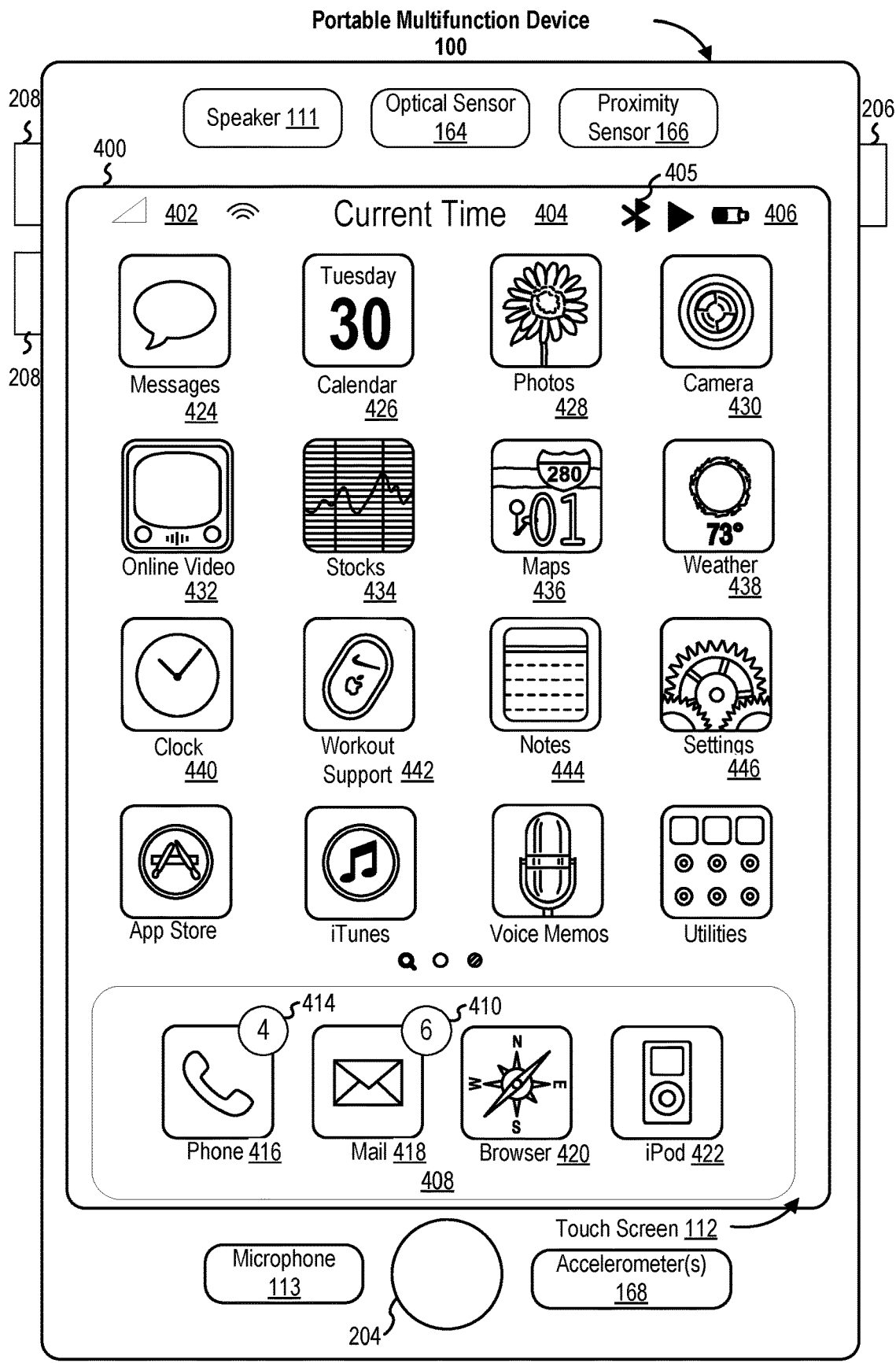
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
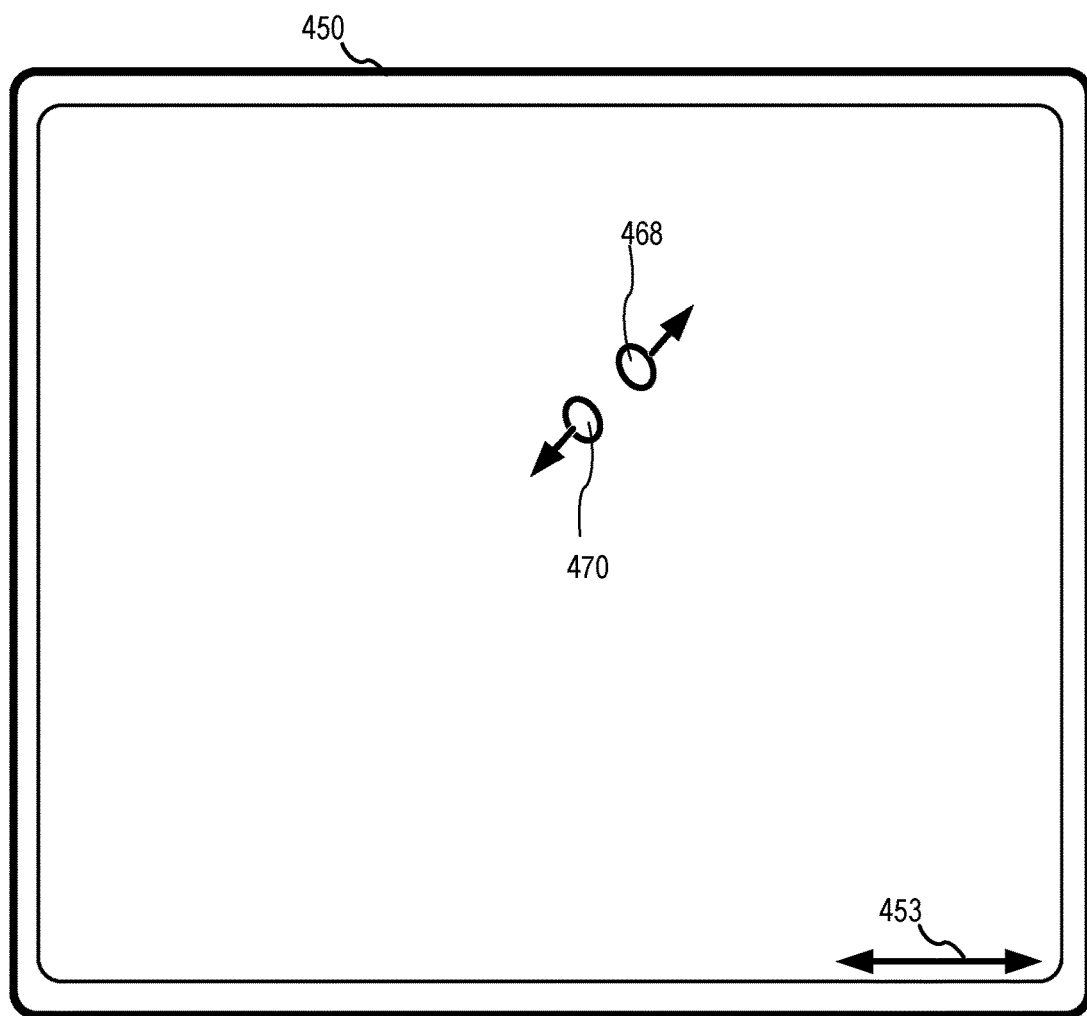
FIG. 4B illustrates an exemplary user interface for a multifunction device with a touch-sensitive surface that is separate from the display in accordance with some embodiments.
Figure 4B:
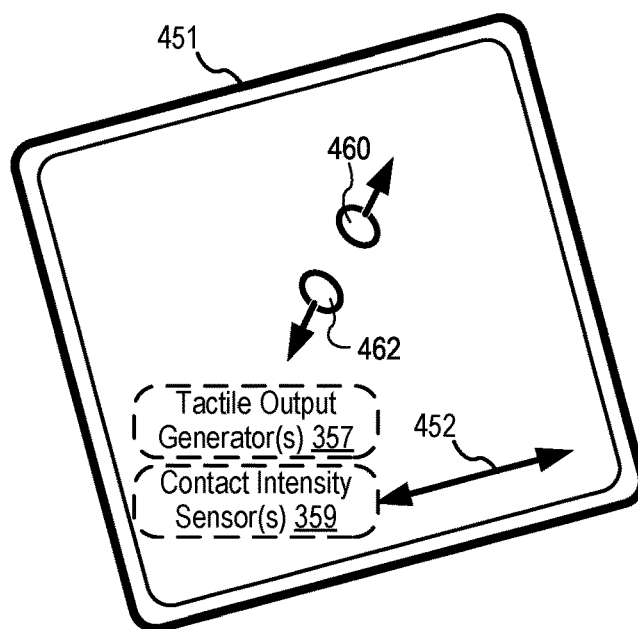

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
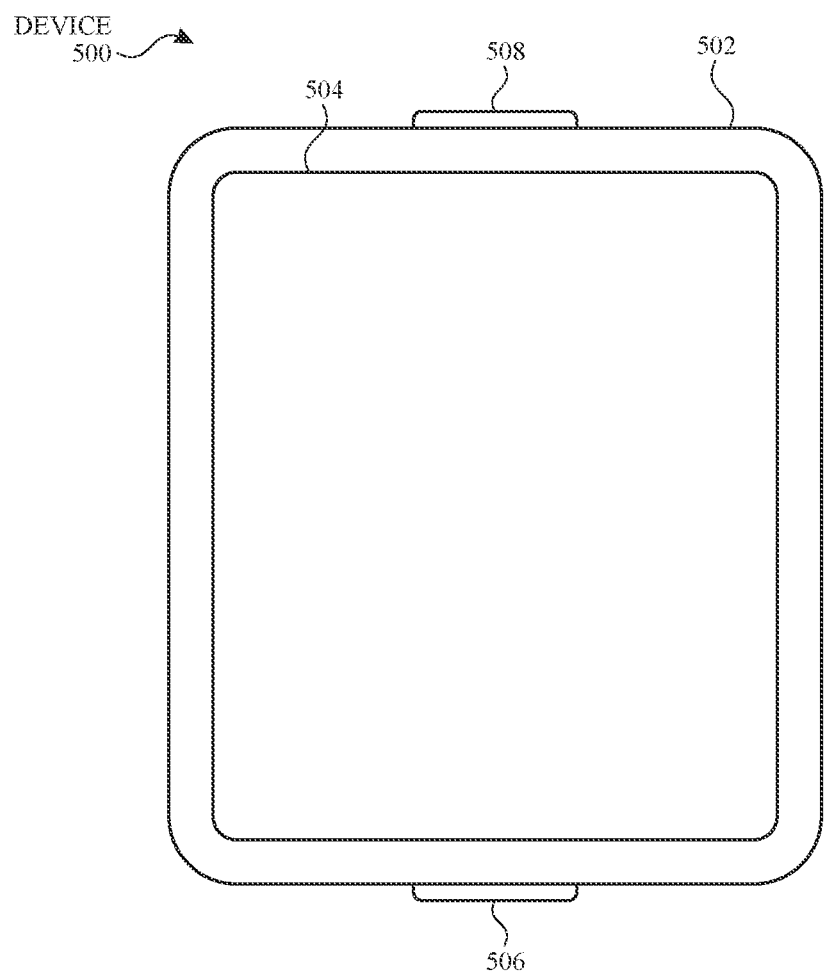
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
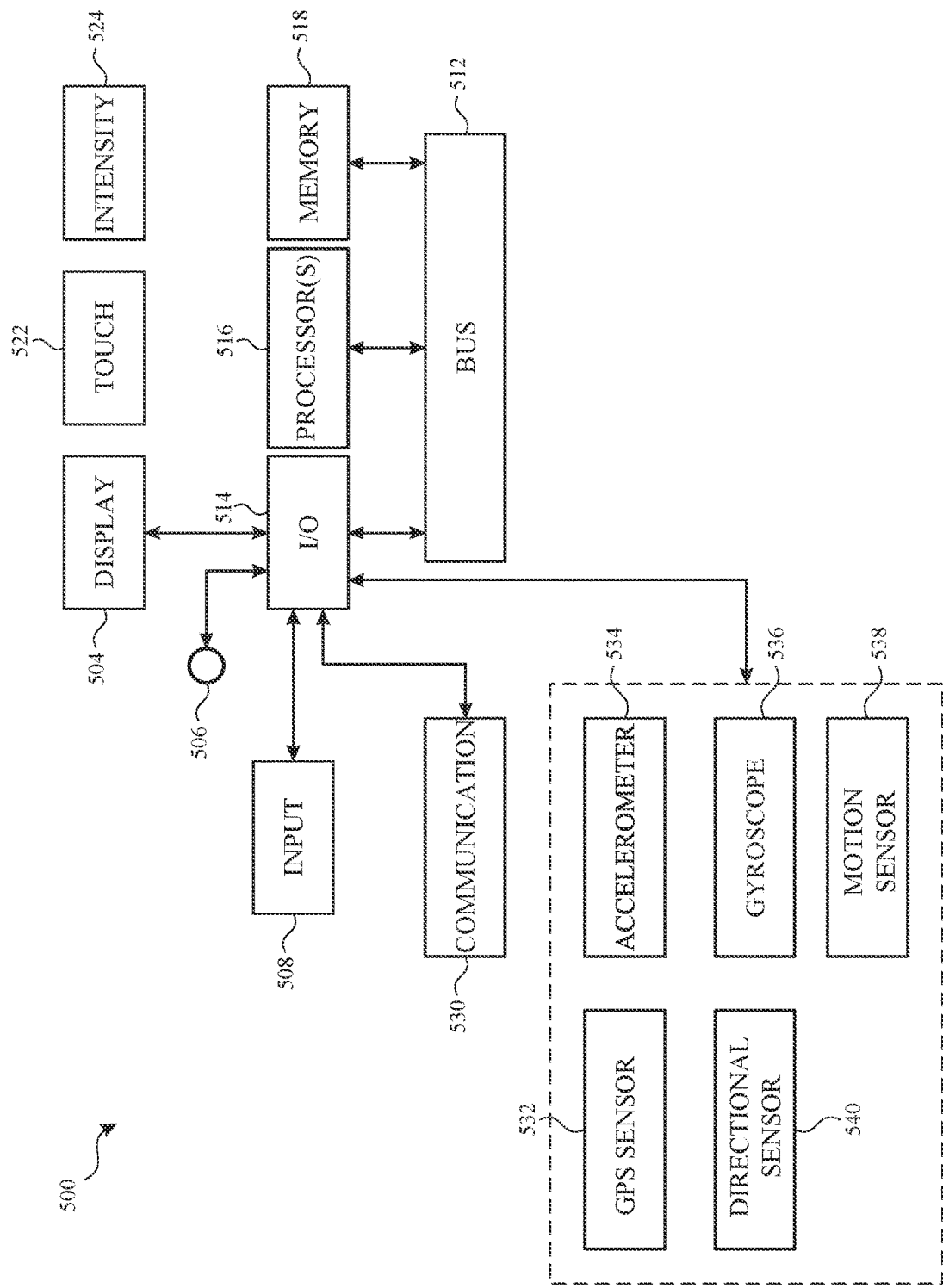
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including method 800 (FIGS. 8A-8B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

FIG. 6 illustrates an exemplary system for updating a language model based on user feedback in accordance with some embodiments. In some embodiments, system 600 may be implemented on one or more electronic devices (e.g., 100, 300, 500, 700) and the components and functions of system 600 may be distributed in any manner between the devices. In some embodiments, system 600 may be implemented on one or more server devices having architectures similar to or the same as devices 100, 300, 500, or 700 (e.g., processors, network interfaces, controllers, and memories) but with greater memory, computing, and/or processing resources than devices 100, 300, 500, or 700. In other embodiments, system 600 may be implemented according to a client-server architecture, where the components of system 600 may be distributed in any manner between one or more client devices (e.g., 100, 300, 500, 700) and one or more server devices communicatively coupled to the client device(s). The systems illustrated in these figures are used to illustrate the processes described below, including the processes in FIGS. 8A-8B.

System 600 is implemented using hardware, software, or a combination of hardware and software to carry out the principles discussed herein. Further, system 600 is exemplary, and thus system 600 can have more or fewer components than shown, can combine two or more components, or can have a different configuration or arrangement of the components. Further, although the below discussion describes functions being performed at a single component of system 600, it is to be understood that such functions can be performed at other components of system 600 and that such functions can be performed at more than one component of system 600.

System 600 includes input module 602. Input module 602 obtains one or more input tokens. In some embodiments, each input token may represent one or more characters or one or more words (e.g., an individual character, a character sequence, an emoji, a fragment of a word, a word, a fragment of a phrase, an entire phrase, a fragment of a sentence, an entire sentence, and/or the like), one or more phonemes (e.g., for speech recognition), or one or more spatial coordinates (e.g., for handwriting recognition). In some embodiments, input module 602 obtains the one or more input tokens based on user text input at an electronic device (e.g., device 100, 300, 500, or 700). In some embodiments, the user text input at the electronic device is performed via gesture input (e.g., handwritten input), device keyboard input, speech input (e.g., using a dictation service), peripheral device input, or a combination or sub-combination thereof. For example, FIG. 7A illustrates user text input 702A ("Vegan chickn"), displayed in a text input field of a notebook application of device 700. As another example, FIG. 7C illustrates user text input 702C ("Vegan chick'n for") displayed in the text input field of the notebook application of device 700.

System 600 includes initial language model 604. Initial language model 604 includes a joint prediction model. In response to receiving the one or more input tokens from input module 602, the joint prediction model determines (e.g., predicts), based on the one or more input tokens, a first set of one or more output tokens (e.g., the predicted next text input based on the preexisting text input) and a corresponding predicted user action to be performed in response to the first set of one or more output tokens (e.g., in response to the prediction).

Determining (e.g., predicting) the first set of one or more output tokens includes obtaining a first output token probability distribution Y' drawn from a first overall probability distribution D' of initial language model 604. In some embodiments, the first output token probability distribution Y' represents a probability distribution over an underlying token vocabulary of language model 604 at a specific point in time (e.g., specifically given the one or more input tokens), while the first overall probability distribution D' represents a probability distribution over all such probability distributions (e.g., over time). Accordingly, in these embodiments, the first output token probability distribution Y' is said to be drawn from the first overall probability distribution D'. In some embodiments, the first output token probability distribution Y' may be obtained using an encoder-decoder model, which encodes the one or more input tokens as an input context vector W, and decodes the input context vector W into the first output token probability distribution Y'. For example, with reference to FIG. 7A, the first output token probability distribution Y' may indicate that, given the input context of text input 702A ("Vegan chickn"), the most likely next text input is predicted token 704A ("chickens"), correcting the token "chickn" of text input 702A.

In some embodiments, the joint prediction model further predicts a second set of one or more output tokens based on the first output token probability distribution Y'. For example, with reference to FIG. 7A, the first output token probability distribution Y' may indicate not only that the most likely next text input is predicted token 704A ("chickens"), but also that the second most likely next text input is predicted token 704B ("chickenpox"), and so forth.

In some embodiments, the first set of one or more output tokens represent a predicted replacement for at least one of the one or more input tokens, such as a correction or a completion (e.g., of an incomplete word). For example, in FIG. 7A, predicted token 704A ("chickens") and predicted token 704B ("chickenpox") are tokens predicted as corrections to the final word of text input 702A ("Vegan chickn"). In some embodiments, the first set of one or more output tokens represent predicted next tokens (e.g., tokens following the one or more input tokens). For example, in FIG. 7C, predicted tokens 704C ("lunch"), 704D ("dinner"), and 704E ("the") are tokens predicted to follow text input 702C ("Vegan chick'n for").

In some embodiments, the joint prediction model determines (e.g., predicts) the corresponding predicted user action using an action classifier. In some embodiments, the corresponding predicted user action may be a user action accepting the first set of one or more output tokens or a user action not accepting the first set of one or more output tokens (e.g., a prediction that the user will reject the set of one or more output tokens, a prediction that the user will accept a different set of one or more output tokens, etc.) For example, in FIG. 7A, the predicted user action may be a prediction that the user will accept predicted token 704A ("chickens") as a correction to the final word of text input 702A ("Vegan chickn"). As another example, in FIG. 7C, the predicted user action may be a prediction that the user will not accept predicted token 704C ("lunch") as the next token following text input 702C ("Vegan chick'n for"), but will instead accept predicted token 704D ("dinner"), or a prediction that the user will not accept any of predicted tokens 704C ("lunch"), 704D ("dinner"), or 704E ("the").

In some embodiments, initial language model 604 includes an n-gram model. In some embodiments, initial language model 604 includes a neural network-based model (e.g., a self-attentive neural network based model, a recurrent neural network (RNN)-based model, a long short term memory (LSTM)-based model, an LSTM-based model with attention, a gated recurrent unit (GRU)-based model, transformer-based models (e.g., vanilla transformer), an XLNet-based model, and so forth).

System 600 includes output module 606. Output module 606 provides an output including at least the first set of one or more output tokens. For example, as illustrated in FIG. 7A, providing the output includes displaying a set of affordances indicating predicted token 704A ("chickens") and predicted token 704D ("chickenpox"). As predicted tokens 704A and 704B represent predicted corrections to text input 702A ("Vegan chickn"), if a user were to select one of the affordances, at least a portion of text input 702A would be replaced with the corresponding predicted token in the text input field. Accordingly, as illustrated in FIG. 7A, providing the output may also include displaying an indication of the portion of text input 702A (e.g., the highlighting around the portion "chickn") that would be replaced with the predicted token(s) if the user selects one of the predictions. As another example, as illustrated in FIG. 7C, providing the output includes displaying a set of selectable affordances indicating predicted token 704C ("lunch"), predicted token 704D ("dinner"), and predicted token 704E ("the"). As predicted tokens 704C, 704D, and 704E represent predicted next tokens following text input 702C ("Vegan chick'n for"), if a user were to select one of the affordances, the corresponding predicted token would be inserted following text input 702C in the text input field.

System 600 includes feedback module 608. After output module 606 provides the output including the first set of one or more output tokens, feedback module 608 detects a first user action responding to the first set of one or more output tokens. For example, as shown in FIG. 7B, rather than selecting one of the affordances indicating predicted tokens 704A or 704B, the user manually corrects text input 702A, deleting the portion "chickn" and replacing it with text input 702B, "chick'n" in the text input field. Accordingly, feedback module 608 detects that the user has taken an action rejecting the predicted corrections (e.g., an action that does not accept the first set of one or more output tokens). As another example, as shown in FIG. 7D, rather than selecting one of the affordances indicating predicted tokens 704C, 704D, or 704E (e.g., the predicted next text), the user manually enters text input 702D, "kebabs," following text input 702C in the text input field. Accordingly, feedback module 608 detects that the user has taken an action rejecting the predicted next text (e.g., an action that does not accept the first set of one or more output tokens). In some embodiments, based on the detected first user action, feedback module 608 determines one or more user-validated tokens. For example, a user-validated token is a token approved of or provided by the user, such as a token parsed from text input 702B ("chick'n") of FIG. 7B or a token parsed from text input 702D ("kebabs") of FIG. 7D.

In response to detecting the user action responding to the first set of one or more output tokens, feedback module 608 determines whether the first user action matches the predicted user action (e.g., the predicted response to the first set of one or more tokens). For example, referring to FIGS. 7A-7B, if the predicted user action was an acceptance of predicted token 704A ("chickens") as a correction to text input 702A ("Vegan chickn"), the first user action rejecting the predicted corrections illustrated in FIG. 7B does not match the predicted action. As another example, referring to FIGS. 7C-7D, if the predicted user action was a rejection of predicted token 704C ("lunch") as the next token following text input 702B ("Vegan chick'n for"), but an acceptance of predicted token 704D ("dinner"), the first user action rejecting all of the predicted next tokens illustrated in FIG. 7D does not match the predicted user action.

System 600 includes updating module 610. If feedback module 608 determines that the first user action does not match the predicted user action, updating module 610 initiates an update of initial language model 604, based on the user feedback data (e.g., the first user action and/or the user-validated token), to obtain updated language model 620. For example, a mismatch between the predicted user action and the first user action can automatically trigger an update to the language model used for text prediction in order to incorporate the user feedback data as it is received.

As discussed above, initial language model 604 includes a joint prediction model, which predicts tokens using first overall probability distribution D' and user actions using an action classifier. Accordingly, in order to update the action prediction of initial language model 604, in some embodiments, updating module 610 implements a reinforcement learning model to modify an action-prediction parameter of the action classifier of the joint prediction model for updated language module 620 based on the mismatch between the first user action and the detected first action. Likewise, in order to update the token prediction of initial language model 604, in some embodiments, updating module 610 implements a generative adversarial network (GAN) to generate updated overall probability distribution D" of updated language model 620 by iteratively updating initial language model 604.

In embodiments implementing a GAN, system 600 includes target language model 612, which is used to constrain the update of initial language model 604 using the GAN. Like initial language model 604, target language model 612 includes a second overall token probability distribution D (e.g., representing an output probability distributions over all discrete output probability distributions, as discussed above with respect to the first overall probability distribution D'). In some embodiments, target language model 612 has been trained on a set of user data. For example, the set of user data may include data generated by the user (e.g., text input by the user) and/or data associated with the user (e.g., text the user has received, read, or otherwise interacted with). Accordingly, by using target language model 612 to constrain the update of initial language model 604 using the GAN, the user data is reflected in updated language module 620. In some embodiments, target language model 612 has been trained on a set of general training data, such as a very large corpus of text samples used to train language models in accordance with general usage (e.g., rather than for a specific user).

In these embodiments, updating module 610 includes generator 614 of the GAN, which iteratively updates first overall probability distribution D' to ultimately obtain updated overall probability distribution D". For example, generator 614 can be initialized with initial language model 604/first overall probability distribution D', such that, for an initial iteration of the update, a generated output token probability distribution $\mathcal{G}(W)$ is equivalent to the first output token probability distribution Y' drawn from the first overall probability distribution D' given the input context vector W (e.g., for the initial iteration, $\mathcal{G}(W)=Y'$).

In these embodiments, updating module 610 further includes adjustment module 616. Adjustment module modifies (e.g., adjusts) the generated output token probability distribution $\mathcal{G}(W)$, based on the user feedback data (e.g., the first user action and/or the user-validated token), to obtain a modified output token probability distribution Y". In order to modify $\mathcal{G}(W)$ based on the user feedback data, adjustment module 616 generates a sparse output token probability distribution Z based on the one or more user-validated tokens determined from the detected first user action. For example, for the user-validated token parsed from text input 702B ("chick'n") of FIG. 7B, the sparse output token probability distribution Z is a probability distribution over the underlying token vocabulary of initial language model 604 that predicts "chick'n" as a correction to the input context of text input 702A ("Vegan chickn"). Accordingly, for the initial iteration where $\mathcal{G}(W)=Y'$, the modified output token probability distribution Y" is calculated as:

$$Y'' = {}_c\mathcal{A}(\mathcal{G}(W)) = {}_c\mathcal{A}(Y') = \frac{Y' + \lambda \cdot Z}{\|Y' + \lambda \cdot Z\|}$$

where $\lambda>0$ is an optional weight that controls the importance of the user feedback (e.g., the first user action and the user-validated token) relative to the prediction (e.g., the predicted user action and the first set of one or more tokens). The normalization ensures that the modified output token probability distribution Y" is a proper probability distribution over the underlying token vocabulary of initial language model 604.

In these embodiments, updating module 610 further includes discriminator 618. Discriminator 618 is trained to determine a probability D that a given output probability distribution is drawn from the second (e.g., target) overall token probability distribution D. For example, discriminator 618 may be trained to output D(Y)=1 given an output token probability distribution Y known to be drawn from the second (e.g., target) overall probability distribution D, and trained to output D(Y')=0 given output token probability distribution Y' known not to be drawn from D (e.g., for the first output token probability distribution Y' known to be drawn from the first overall probability distribution D' of initial language model 604). A trained discriminator output of 0.5 thus indicates an equal probability that the observed output token probability distribution is equally likely to have been drawn from D as it is to have been drawn from a different overall token probability distribution. Accordingly, in some embodiments, updating module 810 may use convergence criteria including a discriminator output within a narrow threshold range of 0.5.

Accordingly, in order to update initial language model 604 based on the user feedback data (e.g., the first user action and/or the user-validated token), generator 616 ($\mathcal{G}$) and discriminator 618 ($\mathcal{D}$) are trained jointly by solving:

$$\min_{\mathcal{G}} \max_{\mathcal{D}} \mathcal{K}(\mathcal{D}, \mathcal{G}) =$$
$$\mathbb{E}_{Y \sim D}\{\log[\mathcal{D}(Y)]\} + \mathbb{E}_{{}_c\mathcal{A}[\mathcal{G}(W)] \sim D''}\{\log[1 - \mathcal{D}({}_c\mathcal{A}[\mathcal{G}(W)])]\}$$

where $\mathcal{K}(\mathcal{D}, \mathcal{G})$ denotes an overall cost function of a minimax two-player game and where W represents an input of previous tokens (i.e., an input context). Maximizing $\mathcal{K}$ over $\mathcal{D}$ while minimizing $\mathcal{K}$ over $\mathcal{G}$ ensures that, after enough iterations, generator 616 will have updated the first language model such that the modified output probability distribution $Y''=\mathcal{A}[\mathcal{G}(W)]$ (e.g., an output probability distribution adjusted based on the user feedback data), drawn from updated overall probability distribution D", produces a probability $\mathcal{D}(Y'')$ that falls within a narrow range of 0.5. When $\mathcal{D}(Y'')$ falls within a narrow range of 0.5 (e.g., when $\mathcal{D}(Y'')$ satisfies convergence criteria), the second output token probability distribution Y" is probabilistically indistinguishable from an output probability distribution Y drawn from the second (e.g., target) overall probability distribution D, and thus, the updated overall probability distribution D" is considered to have converged with the second overall probability distribution D.

In some embodiments, once updating module 610 updates initial language model 604 to obtain updated language model 620, system 600 uses updated language model 620 for text prediction. For example, upon receiving subsequent input tokens (e.g., at a text input field of device 700) from input module 602, the joint prediction model of updated language model 620, including the updated action classifier and the updated overall probability distribution D", predicts a new set of one or more output tokens and a corresponding user action to be performed on the new set of one or more output tokens.

FIGS. 8A-8B illustrate a flow diagram illustrating a method for updating a language model based on user feedback using a computer system in accordance with some embodiments. Method 800 is performed at an electronic device (e.g., 100, 300, 500, 700) with one or more processors and memory. Some operations in method 800 are, optionally, combined, the orders of some operations are, optionally, changed, and some operations are, optionally, omitted.

In some embodiments, the electronic device (e.g., 700) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 800 provides an efficient way to update a language model based on user feedback. Efficiently updating a language model used for text prediction (e.g., to accurately reflect a user's individual linguistic idiosyncrasies) reduces the cognitive burden on a user for text entry, thereby creating a more efficient human-machine interface. For battery-operated computing devices, efficiently updating the language model and allowing the user to enter text more quickly and accurately conserves power and increases the time between battery charges.

Referring to FIG. 8A, at block 802, one or more input tokens are received. In some embodiments, each input token of the set of one or more input tokens includes (i.e., represents) one or more characters or one or more words (e.g., an individual character, a character sequence, a fragment of a word, a word, a fragment of a phrase, an entire phrase, a fragment of a sentence, an entire sentence, and the like), one or more phonemes (e.g., for speech recognition), or one or more spatial coordinates (e.g., for handwriting recognition). In some embodiments, the set of one or more input tokens are obtained (e.g., parsed) from a user text input received at the electronic device from the one or more input devices. For example, the user text input may be received as a gesture input (e.g., handwritten input), device keyboard input, speech input (e.g., using a dictation service), peripheral device input, or a combination or sub-combination thereof. In some embodiments, the one or more input tokens are displayed (e.g., by a display generation component of the electronic device) in a text input field of a user interface. For example, the one or more input tokens may be displayed as a user is inputting text via a user interface for a messaging application, a notebook application, a search bar, or the like.

In response to receiving the one or more input tokens at block 802, at block 804, a first set of one or more output tokens is predicted using a first output token probability distribution drawn from a first overall token probability distribution of a first language model. As discussed above, in some embodiments, the first output token probability distribution (e.g., Y') represents a probability distribution over an underlying token vocabulary of the first language model at a specific point in time (e.g., specifically given the one or more input tokens received at block 802 (e.g., W)), while the first overall probability distribution (e.g., D') represents a probability distribution over all such probability distributions (e.g., over time). Accordingly, in these embodiments, the first output token probability distribution is said to be drawn from the first overall probability distribution.

In some embodiments, the first set of one or more output tokens represent a predicted correction to at least one of the one or more input tokens. For example, as illustrated in FIG. 7A, predicted token 704A ("chickens") is predicted as a corrected version of the final token of text input 702A ("Vegan chickn"). In some embodiments, the first set of one or more output tokens represent predicted next tokens following the one or more input tokens. For example, as illustrated in FIG. 7C, predicted token 704C ("lunch") is predicted as the next token to follow text input 702C ("Vegan chick'n for").

In some embodiments, in addition to predicting the first set of one or more output tokens, a second set of one or more output tokens may be predicted based on the first output token probability distribution (e.g., Y'), where a probability that the first set of one or more tokens is the next text input is greater than a probability that the second set of one or more tokens is the next text input. For example, based on the one or more input tokens "Vegan chickn" (e.g., as illustrated in FIG. 7A), the first output token probability distribution (e.g., Y') may indicate a probability that the token "chicken" is the most likely next text input and a probability that the token "chickenpox" is the second most likely text input (e.g., as potential corrections to the input token "chickn"). As the first output token probability distribution (e.g., Y') is a probability distribution over the underlying token vocabulary of the first language model, in some embodiments, even further predictions of output tokens can be made (e.g., a third-most likely prediction, a fourth-most likely prediction, and so forth).

At block 806, a predicted user action to be performed on the first set of one or more output tokens is generated. For example, as described above, the first language model may include a joint prediction model (such as an encoder-decoder model) that uses the first overall token distribution (e.g., D') to make a text prediction (e.g., as described above), and an action classifier to predict the user's response to the text prediction. In some embodiments, the predicted user action is a predicted acceptance of the first set of one or more output tokens. For example, with reference to FIG. 7A, the predicted user action may be a prediction that the user will accept predicted token 704A ("chickens") as a correction to the final word of text input 702A ("Vegan chickn"). In some embodiments, the predicted user action is a predicted rejection of the first set of one or more output tokens. For example, with reference to FIG. 7A, the predicted user action may be a prediction that the user will not accept predicted token 704A ("chickens"), for instance, if the probability that predicted token 704A ("chickens") is the next text input fails to exceed a confidence threshold, or if the probability that predicted token 704B ("chickenpox") is the next text input falls within a narrow margin of the probability of predicted token 704A ("chickens").

At block 808, an output including the first set of one or more output tokens is provided. In some embodiments, the output may include additional sets of predicted output tokens, such as the second set of output tokens discussed above. For example, as illustrated in FIG. 7C, an output indicating predicted token 704C ("lunch"), predicted token 704D ("dinner"), and predicted token 704E ("the") is provided, where predicted token 704C ("lunch") is the first (e.g., most likely) set of output tokens, predicted token 704D ("dinner") is the second (e.g., next most likely) set of output tokens, and so forth (e.g., predicted token 704E ("the") is the third most likely prediction).

In some embodiments where the first set of one or more output tokens represent a set of predicted next tokens following the one or more input tokens, providing the output includes providing a first affordance indicating the first set of one or more output tokens which, if selected, inserts the first set of one or more output tokens after the one or more input tokens in the text input field. For example, as illustrated in FIG. 7C, predicted token 704C ("lunch") is indicated by a selectable affordance situated above a keyboard (e.g., as part of a predictive typing interface), such that selecting the affordance would insert the word "lunch" after text input 702C ("Vegan chick'n for"). In some embodiments, the first affordance may be selected with an explicit user input, such as a tap or click.

In some embodiments where the first set of one or more output tokens represent a correction to at least one token of the one or more input tokens, providing the output includes providing a second affordance indicating the first set of one or more output tokens which, if selected, replaces the at least one input token with the first set of one or more output tokens. For example, as illustrated in FIG. 7A, predicted token 704A ("chickens") is indicated by a selectable affordance situated above a keyboard (e.g., as part of a predictive typing interface), and the text in the input field is highlighted to indicate that the input token "chickn" will be replaced if the affordance is selected. As another example, the first set of one or more output tokens may be indicated by an affordance situated in the text input field, such as a pop-up correction situated adjacent to the input token that would be replaced if the affordance is selected. In some embodiments, the second affordance may be selected with an explicit user input, such as a tap or click.

In some embodiments where the first set of one or more output tokens represent a correction to at least one input token of the one or more input tokens, providing the output includes automatically replacing the at least one input token with the first set of one or more output tokens. For example, if the first set of one or more output tokens are indicated by a pop-up affordance situated adjacent to an input token, and the user continues to input text without dismissing the pop-up affordance, the input token may be automatically replaced (e.g., without requiring an explicit user input selecting the pop-up affordance). As another example, an input token may be automatically replaced with the first set of one or more output tokens without first indicating the first set of one or more output tokens with an affordance, for instance, if the probability that the first set of one or more output tokens is the next text input is very high (e.g., if the probability exceeds a certain confidence threshold).

Referring to FIG. 8B, at block 810, a first user action responding to the first set of one or more output tokens is detected. In some embodiments, the first user action is a user input accepting the first set of one or more output tokens. For example, referring to FIG. 7A, a user input selecting the affordance for predicted token 704A ("chickens") is a first user action accepting the first set of one or more output tokens (e.g., the best prediction). In some embodiments, the first user action is a user input not accepting the first set of one or more output tokens. For example, referring to FIG. 7A, a user input selecting the affordance for predicted token 704B ("chickenpox") (e.g., the second set of output tokens) is a first user action that does not accept predicted token 704A (e.g., the first set of output tokens). As another example, if, instead of providing predicted token 704A ("chicken") as an affordance, the portion of text input 702A "chickn" had been automatically replaced with predicted token 704A, a user input manually deleting the word "chicken" and replacing it with text input 702B, "chick'n," is a first user action that does not accept predicted token 704A. As another example, referring to FIG. 7D, the user input manually entering text input 702D, "kebabs," after text input 702B ("Vegan chick'n for") is a first user action that does not accept predicted token 704C ("lunch") (e.g., the first set of output tokens).

In some embodiments, in response to detecting the first user action responding to the first set of one or more output tokens, a determination is made whether the first user action matches the predicted user action. A mismatch between the detected user action and the predicted user action indicates that the first language model has incorrectly anticipated user behavior. For example, if the action classifier of the first language model predicted that the user would accept the first set of one or more output tokens as a prediction, but the user rejects the first set of one or more output tokens (e.g., by manually entering a different token or selecting a different prediction), the mismatch may indicate that the first output token probability distribution Y' is too heavily skewed in favor of the first set of one or more output tokens, or that the action classifier is overly-confident in user acceptance of predictions. Accordingly, in some embodiments, this determination can be used to trigger an update to the first language model based on the unexpected user feedback, for instance, as described below with respect to blocks 812-822.

In accordance with a determination, at block 812, that the first (e.g., detected) user action does not match the predicted user action, at block 814, a modified output token probability distribution is generated based on the first (e.g., detected) user action. In some embodiments implementing a GAN (e.g., as described with respect to FIG. 6), the modified output token probability is an adjusted version of output token probability distribution $\mathcal{G}(W)$.

In some embodiments, generating the modified output probability distribution includes, at block 816, determining, based on the first user action, a set of one or more user-validated tokens. For example, referring to FIG. 7B, the token "chick'n" parsed from text input 702B is determined to be a user-validated token, as the user has explicitly entered the token to correct text input 702A ("Vegan chickn"). As another example, referring to FIG. 7D, the token "kebabs" parsed from text input 702D is determined to be a user-validated token, as the user has explicitly entered the token following text input 702C ("Vegan chick'n for").

In these embodiments, at block 818, a second output token probability distribution is generated based on the set of one or more user-validated tokens determined at block 816. For example, the second output token probability distribution may be a sparse output token probability distribution Z over an underlying token vocabulary, where the sparse output token probability distribution Z indicates that the user-validated token is the anticipated next user input given the one or more input tokens (e.g., given input context vector W).

In these embodiments, at block 820, an output token probability distribution drawn from the first overall token probability distribution is modified based on the second output token probability distribution, generating the modified output token probability distribution used to update the first overall token probability distribution. For example, as discussed above, in embodiments implementing a GAN (e.g., as described with respect to FIG. 6), a generator component of the GAN can be initialized with the first language model/first overall token probability distribution. Accordingly, for an initial iteration of the update, the output token probability being modified is the first output token probability distribution Y' drawn from the first overall token probability distribution D' given the input context vector W (e.g., for the initial iteration, $\mathcal{G}(W)=Y'$). Accordingly, for the first iteration $\mathcal{G}(W)=Y'$, the modified output token probability distribution Y" is calculated as:

$$Y'' = \mathcal{A}[\mathcal{G}(W)] = \mathcal{A}(Y') = \frac{Y' + \lambda \cdot Z}{\|Y' + \lambda \cdot Z\|}$$

where $\lambda > 0$ is an optional weight that controls the importance of the user feedback (e.g., the first user action and the user-validated token) relative to the prediction (e.g., the predicted user action and the first set of one or more tokens). The normalization ensures that the second output token probability distribution Y" is a proper probability distribution over the underlying token vocabulary of the first language model. For subsequent iterations, the output token probability distribution $\mathcal{G}(W)$ is drawn from the current (e.g., updated) iteration of the overall token probability distribution, and is modified according to the same formula to generate the modified output token probability distribution.

At block 822, the first overall token probability distribution is updated to converge to a second overall token probability distribution based on the modified output token probability distribution. In some embodiments, the second overall token probability distribution is drawn from a second language model. For example, as described with respect to FIG. 6, the second language model may be a target language model including the second (e.g., target) overall token probability distribution D. In some embodiments, the second language model has been trained on a set of general training data, such as a very large corpus of text samples used to train language models in accordance with general usage (e.g., rather than for a specific user). In some embodiments, the second language model is trained on a set of user data including data generated by a user of the device and data associated with the user of the electronic device. For example, the set of user data may include data generated by the user (e.g., text input by the user) and/or data associated with the user (e.g., text the user has received, read, or otherwise interacted with). Accordingly, as the first overall token probability distribution is updated to converge to the second overall token probability distribution, the updated first overall token probability distribution reflects the user-specific training of the second overall token probability distribution.

In some embodiments implementing a GAN (e.g., as described with respect to FIG. 6), updating the first overall token probability distribution to converge to a second overall token probability distribution includes training a discriminator to determine a probability that a given output token probability is drawn from the second overall token probability distribution. In these embodiments, the discriminator is used to determine a probability that the modified output token probability distribution is drawn from the second overall token probability distribution. For example, may be trained to output $\mathcal{D}(Y)=1$ given an output token probability distribution Y known to be drawn from the second (e.g., target) overall token probability distribution D, and trained to output $\mathcal{D}(Y')=0$ given output token probability distribution Y' known not to be drawn from D. A trained discriminator output of 0.5 thus indicates an equal probability that the observed output token probability distribution is equally likely to have been drawn from D as it is to have been drawn from a different overall token probability distribution.

In these embodiments, updating the first overall token probability distribution to converge to a second overall token probability distribution may include determining whether the probability that the modified output token probability distribution is drawn from the second overall token probability distribution satisfies convergence criteria. For example, the convergence criteria may require that the probability that the modified output token probability distribution is drawn from the second overall token probability distribution falls within a narrow range of 0.5. In accordance with a determination that the probability satisfies the convergence criteria, a determination is made that the first overall token probability distribution has converged to the second overall token probability distribution.

Accordingly, in these embodiments, the generator iteratively updates the first overall token probability distribution of the first language model until the modified output token probability distribution drawn from the current (e.g., updated) iteration of the first overall token probability distribution produces $\mathcal{D}(Y'')$ within a narrow range of 0.5 (e.g., an equal probability that modified output token probability distribution was drawn from D vs. not). The first overall token probability distribution can be iteratively updated to converge to the second overall token probability distribution D by solving:

$$\min_{\mathcal{G}} \max_{\mathcal{D}} \mathcal{K}(\mathcal{D}, \mathcal{G}) = \mathbb{E}_{Y \sim D}\{\log[\mathcal{D}(Y)]\} + \mathbb{E}_{\mathcal{A}[\mathcal{G}(W)] \sim D''}\{\log[1 - \mathcal{D}(\mathcal{A}[\mathcal{G}(W)])]\}$$

where $\mathcal{K}(\mathcal{D}, \mathcal{G})$ denotes an overall cost function of a minimax two-player game and where W represents an input of previous tokens (i.e., an input context). The output token probability distribution $\mathcal{G}(W)$ is modified (e.g., adjusted) according to the adjustment formula above, such that the solution is generated based on the modified output token probability $\mathcal{A}[\mathcal{G}(W)]$. Accordingly, maximizing $\mathcal{K}$ over $\mathcal{D}$ while minimizing $\mathcal{K}$ over $\mathcal{G}$ ensures that, after enough iterations, the generator will have updated the first language model to the point where the modified output token probability distribution $Y''=\mathcal{A}[\mathcal{G}(W)]$, drawn from the current (e.g., updated) iteration of the first overall token probability distribution, is probabilistically similar to an output token probability distribution Y known to be drawn from the second (e.g., target) overall probability distribution D (e.g., $\mathcal{D}(Y'')$ falls within a narrow margin of 0.5). At that point, the current (e.g., updated) iteration of the first overall token probability distribution is considered to have converged with the second overall token probability distribution D. As $$\min_{\mathcal{G}} \max_{\mathcal{D}} \mathcal{K}(\mathcal{D}, \mathcal{G})$$

is solved using the output probability distributions modified based on the first user action (e.g., $\mathcal{A}[\mathcal{G}(W)]$), the first overall token probability distribution is updated in a way that reflects the first user action (e.g., the user feedback).

In some embodiments, in addition to updating the first overall token probability distribution to converge to a second overall token probability distribution, in accordance with a determination at block 812 that the first user action does not match the predicted user action, a parameter of an action prediction module of the first language model. As discussed above, in some embodiments, the first language model includes a joint prediction model that uses the first overall token distribution to make text predictions, and an action classifier to predict the user's response to the text prediction. Accordingly, in addition to updating the first overall token distribution (e.g., as described above with respect to blocks 814-822), in some embodiments, a parameter of the action classifier is also updated based on the first user action (e.g., the unexpected detected user action).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the update of a language model used for text prediction. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to update the language model used for text prediction. Accordingly, use of such personal information data enables users to have text prediction that reflects their specific preferences and tendencies. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of updating a language model used for text prediction, the present technology can be configured to allow users to select to "opt in" or "opt out" of participation in the collection of personal information data during registration for services or anytime thereafter. In another example, users can select not to provide mood-associated data for updating language models. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a language model can be updated by inferring preferences based on non-personal information data or a bare minimum amount of personal information, such as the content being requested by the device associated with a user, other non-personal information available to the language model, or publicly available information.

What is claimed is:

1. An electronic device, comprising:
   one or more processors;
   a memory; and
   one or more programs, wherein the one or more programs are stored in the memory and configured to be executed by the one or more processors, the one or more programs including instructions for: receiving one or more input tokens, wherein the one or more input tokens are displayed in a text-input field of a user interface; in response to receiving the one or more input tokens, predicting, using a first output token probability distribution drawn from a first overall token probability distribution of a first language model, a first set of one or more output tokens;
   generating a predicted user action to be performed on the first set of one or more output tokens;
   providing an output including the first set of one or more output tokens;
   detecting a first user action responding to the first set of one or more output tokens;
   in accordance with a determination that the first user action does not match the predicted user action:
      generating a modified output token probability distribution based on the first user action; and
      based on the modified output token probability distribution, updating the first overall token probability distribution to converge to a second overall token probability distribution;
receiving an additional one or more input tokens;
in response to receiving the additional one or more input tokens, predicting, using the updated first overall token probability distribution, a second set of one or more output tokens; and
providing a second output including the second set of the one or more output tokens.

2. The electronic device of claim 1, the one or more programs further including instructions for:
predicting a second set of one or more output tokens based on the first output token probability distribution, wherein a first probability of the first set of one or more output tokens is greater than a second probability of the second set of one or more output tokens.

3. The electronic device of claim 1, wherein:
the first set of one or more output tokens represent a set of predicted next tokens following the one or more input tokens; and
providing the output including the first set of one or more output tokens includes providing a first affordance indicating the first set of one or more output tokens, which, if selected, inserts the first set of one or more output tokens after the one or more input tokens in the text-input field.

4. The electronic device of claim 1, wherein the first set of one or more output tokens represent a correction to at least one input token of the one or more input tokens.

5. The electronic device of claim 4, wherein:
providing the output including the first set of one or more output tokens includes providing a second affordance indicating the first set of one or more output tokens, which, if selected, replaces the at least one input token with the first set of one or more output tokens.

6. The electronic device of claim 4, wherein:
providing the output including the first set of one or more output tokens includes automatically replacing the at least one input token with the first set of one or more output tokens.

7. The electronic device of claim 1, wherein the predicted user action is a predicted acceptance of the first set of one or more output tokens.

8. The electronic device of claim 1, wherein the predicted user action is a predicted rejection of the first set of one or more output tokens.

9. The electronic device of claim 1, wherein the first user action is a user input accepting the first set of one or more output tokens.

10. The electronic device of claim 1, wherein the first user action is a user input not accepting the first set of one or more output tokens.

11. The electronic device of claim 1, wherein generating the modified output token probability distribution based on the first user action includes:
determining, based on the first user action, a set of one or more user-validated tokens;
generating, based on the set of one or more user-validated tokens, a second output token probability distribution; and
modifying an output token probability distribution drawn from the first overall token probability distribution based on the second output token probability distribution to generate the modified output token probability distribution.

12. The electronic device of claim 1, the one or more programs further including instructions for:
in accordance with a determination that the first user action does not match the first user action, modifying a parameter of an action-prediction module of the first language model.

13. The electronic device of claim 1, wherein the second overall token probability distribution is drawn from a second language model.

14. The electronic device of claim 13, wherein the second language model is trained on a set of user data including data generated by a user of the device and data associated with the user of the electronic device.

15. The electronic device of claim 1, wherein updating the first overall token probability distribution to converge to the second overall token probability distribution includes:
training a discriminator to determine a probability that a given output token probability is drawn from the second overall token probability distribution; and
determining, using the discriminator, a probability that the modified output token probability distribution is drawn from the second overall token probability distribution.

16. The electronic device of claim 15, wherein updating the first overall token probability distribution to converge to the second overall token probability distribution includes:
determining whether the probability that the modified output token probability distribution is drawn from the second overall token probability distribution satisfies convergence criteria; and
in accordance with a determination that the probability that the modified output token probability distribution is drawn from the second overall token probability distribution satisfies convergence criteria, determining that the first overall token probability distribution has converged to the second overall token probability distribution.

17. A non-transitory computer-readable storage medium storing one or more programs configured to be executed by one or more processors of an electronic device, the one or more programs including instructions for: receiving one or more input tokens, wherein the one or more input tokens are displayed in a text-input field of a user interface; in response to receiving the one or more input tokens,
predicting, using a first output token probability distribution drawn from a first overall token probability distribution of a first language model, a first set of one or more output tokens;
generating a predicted user action to be performed on the first set of one or more output tokens;
providing an output including the first set of one or more output tokens;
detecting a first user action responding to the first set of one or more output tokens;
in accordance with a determination that the first user action does not match the predicted user action:
generating a modified output token probability distribution based on the first user action; and
based on the modified output token probability distribution, updating the first overall token probability distribution to converge to a second overall token probability distribution;
receiving an additional one or more input tokens;
in response to receiving the additional one or more input tokens, predicting, using the updated first overall token probability distribution, a second set of one or more output tokens; and
providing a second output including the second set of the one or more output tokens.

18. The non-transitory computer-readable storage medium of claim 17, wherein:
the first set of one or more output tokens represent a set of predicted next tokens following the one or more input tokens; and
providing the output including the first set of one or more output tokens includes providing a first affordance indicating the first set of one or more output tokens, which, if selected, inserts the first set of one or more output tokens after the one or more input tokens in the text-input field.

19. The non-transitory computer-readable storage medium of claim 17, wherein the first set of one or more output tokens represent a correction to at least one input token of the one or more input tokens.

20. The non-transitory computer-readable storage medium of claim 19, wherein:
providing the output including the first set of one or more output tokens includes providing a second affordance indicating the first set of one or more output tokens, which, if selected, replaces the at least one input token with the first set of one or more output tokens.

21. The non-transitory computer-readable storage medium of claim 19, wherein:
providing the output including the first set of one or more output tokens includes automatically replacing the at least one input token with the first set of one or more output tokens.

22. The non-transitory computer-readable storage medium of claim 17, wherein generating the modified output token probability distribution based on the first user action includes:
determining, based on the first user action, a set of one or more user-validated tokens;
generating, based on the set of one or more user-validated tokens, a second output token probability distribution; and
modifying an output token probability distribution drawn from the first overall token probability distribution based on the second output token probability distribution to generate the modified output token probability distribution.

23. The non-transitory computer-readable storage medium of claim 17, wherein the one or more programs further include instructions, which when executed by the one or more processors, cause the electronic device to:
in accordance with a determination that the first user action does not match the first user action, modify a parameter of an action-prediction module of the first language model.

24. The non-transitory computer-readable storage medium of claim 17, wherein updating the first overall token probability distribution to converge to the second overall token probability distribution includes:
training a discriminator to determine a probability that a given output token probability is drawn from the second overall token probability distribution; and
determining, using the discriminator, a probability that the modified output token probability distribution is drawn from the second overall token probability distribution.

25. The non-transitory computer-readable storage medium of claim 17, wherein updating the first overall token probability distribution to converge to the second overall token probability distribution includes:

determining whether the probability that the modified output token probability distribution is drawn from the second overall token probability distribution satisfies convergence criteria; and
in accordance with a determination that the probability that the modified output token probability distribution is drawn from the second overall token probability distribution satisfies convergence criteria, determining that the first overall token probability distribution has converged to the second overall token probability distribution.

26. A method, comprising:
at an electronic device with one or more processors and memory: receiving one or more input tokens, wherein the one or more input tokens are displayed in a text-input field of a user interface; in response to receiving the one or more input tokens,
predicting, using a first output token probability distribution drawn from a first overall token probability distribution of a first language model, a first set of one or more output tokens;
generating a predicted user action to be performed on the first set of one or more output tokens;
providing an output including the first set of one or more output tokens;
detecting a first user action responding to the first set of one or more output tokens;
in accordance with a determination that the first user action does not match the predicted user action:
generating a modified output token probability distribution based on the first user action; and
based on the modified output token probability distribution, updating the first overall token probability distribution to converge to a second overall token probability distribution;
receiving an additional one or more input tokens;
in response to receiving the additional one or more input tokens, predicting, using the updated first overall token probability distribution, a second set of one or more output tokens; and
providing a second output including the second set of the one or more output tokens.

27. The method of claim 26, wherein:
the first set of one or more output tokens represent a set of predicted next tokens following the one or more input tokens; and
providing the output including the first set of one or more output tokens includes providing a first affordance indicating the first set of one or more output tokens, which, if selected, inserts the first set of one or more output tokens after the one or more input tokens in the text-input field.

28. The method of claim 26, wherein the first set of one or more output tokens represent a correction to at least one input token of the one or more input tokens.

29. The method of claim 28, wherein:
providing the output including the first set of one or more output tokens includes providing a second affordance indicating the first set of one or more output tokens, which, if selected, replaces the at least one input token with the first set of one or more output tokens.

30. The method of claim 28, wherein:
providing the output including the first set of one or more output tokens includes automatically replacing the at least one input token with the first set of one or more output tokens.

31. The method of claim 26, wherein generating the modified output token probability distribution based on the first user action includes:

determining, based on the first user action, a set of one or more user-validated tokens;

generating, based on the set of one or more user-validated tokens, a second output token probability distribution; and modifying an output token probability distribution drawn from the first overall token probability distribution based on the second output token probability distribution to generate the modified output token probability distribution.

32. The method of claim 26, further comprising:

in accordance with a determination that the first user action does not match the first user action, modifying a parameter of an action-prediction module of the first language model.

33. The method of claim 26, wherein updating the first overall token probability distribution to converge to the second overall token probability distribution includes:

training a discriminator to determine a probability that a given output token probability is drawn from the second overall token probability distribution; and determining, using the discriminator, a probability that the modified output token probability distribution is drawn from the second overall token probability distribution.

34. The method of claim 26, wherein updating the first overall token probability distribution to converge to the second overall token probability distribution includes:

determining whether the probability that the modified output token probability distribution is drawn from the second overall token probability distribution satisfies convergence criteria; and in accordance with a determination that the probability that the modified output token probability distribution is drawn from the second overall token probability distribution satisfies convergence criteria, determining that the first overall token probability distribution has converged to the second overall token probability distribution.

\* \* \* \* \*